United States Patent
Sasaki et al.

(10) Patent No.: US 7,062,626 B2
(45) Date of Patent: Jun. 13, 2006

(54) INFORMATION RECORDING MEDIUM, INFORMATION RECORDING METHOD, INFORMATION RECORDING APPARATUS, INFORMATION REPRODUCTION METHOD, AND INFORMATION REPRODUCTION APPARATUS

(75) Inventors: Miyuki Sasaki, Osaka (JP); Yoshiho Gotoh, Osaka (JP); Yoshihisa Fukushima, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 508 days.

(21) Appl. No.: 10/343,542

(22) PCT Filed: Jul. 29, 2002

(86) PCT No.: PCT/JP02/07689

§ 371 (c)(1),
(2), (4) Date: Jan. 22, 2003

(87) PCT Pub. No.: WO03/015095

PCT Pub. Date: Feb. 20, 2003

(65) Prior Publication Data

US 2004/0013059 A1    Jan. 22, 2004

(30) Foreign Application Priority Data

| Aug. 2, 2001 | (JP) | ............... 2001-234537 |
| Aug. 10, 2001 | (JP) | ............... 2001-245088 |
| Aug. 30, 2001 | (JP) | ............... 2001-262479 |
| Sep. 12, 2001 | (JP) | ............... 2001-277306 |
| Sep. 25, 2001 | (JP) | ............... 2001-292593 |
| Nov. 12, 2001 | (JP) | ............... 2001-346779 |

(51) Int. Cl.
*G06F 12/00* (2006.01)

(52) U.S. Cl. .................................................. 711/170
(58) Field of Classification Search .................... None
See application file for complete search history.

(56) References Cited

U.S. PATENT DOCUMENTS

| 200,521 | A | 2/1878 | Edison |
| 6,647,479 | B1 | 11/2003 | Laws |
| 6,839,802 | B1 | 1/2005 | Dimitri et al. |

FOREIGN PATENT DOCUMENTS

JP    04-120634(A1)    4/1992

(Continued)

OTHER PUBLICATIONS

U.S. Appl. No. 10/333,662 filed Jan. 21, 2003, current claims.

(Continued)

*Primary Examiner*—Matthew D. Anderson
(74) *Attorney, Agent, or Firm*—Renner, Otto, Boisselle & Sklar, LLP

(57) ABSTRACT

According to a recording method for a conventional rewritable disc, the latest data is recorded by rewriting data in an identical area. In the case of a disc of which the number of times of data rewrite is limited, this causes a problem that a defect block is easily generated. The present invention has an objective of providing an information recording medium, an information recording and reproduction method, and an information recording and reproduction system apparatus, by which data is recorded sequentially from an unallocated area after an entry sector number, and data recording is sequentially repeated from an inner portion to an outer portion.

4 Claims, 22 Drawing Sheets

FOREIGN PATENT DOCUMENTS

| | | |
|---|---|---|
| JP | 07-085603 | 3/1995 |
| JP | 10-083330 | 3/1998 |
| JP | 10-289524 | 10/1998 |
| JP | 2945735(B2) | 6/1999 |
| JP | 11-096690 | 9/1999 |
| JP | 2000-306362 | 2/2000 |
| JP | 2000-003562 | 7/2000 |
| JP | 2001-084690 | 3/2001 |

OTHER PUBLICATIONS

U.S. Appl. No. 11/066,838 filed Feb. 25, 2005, current claims.

FIG.2
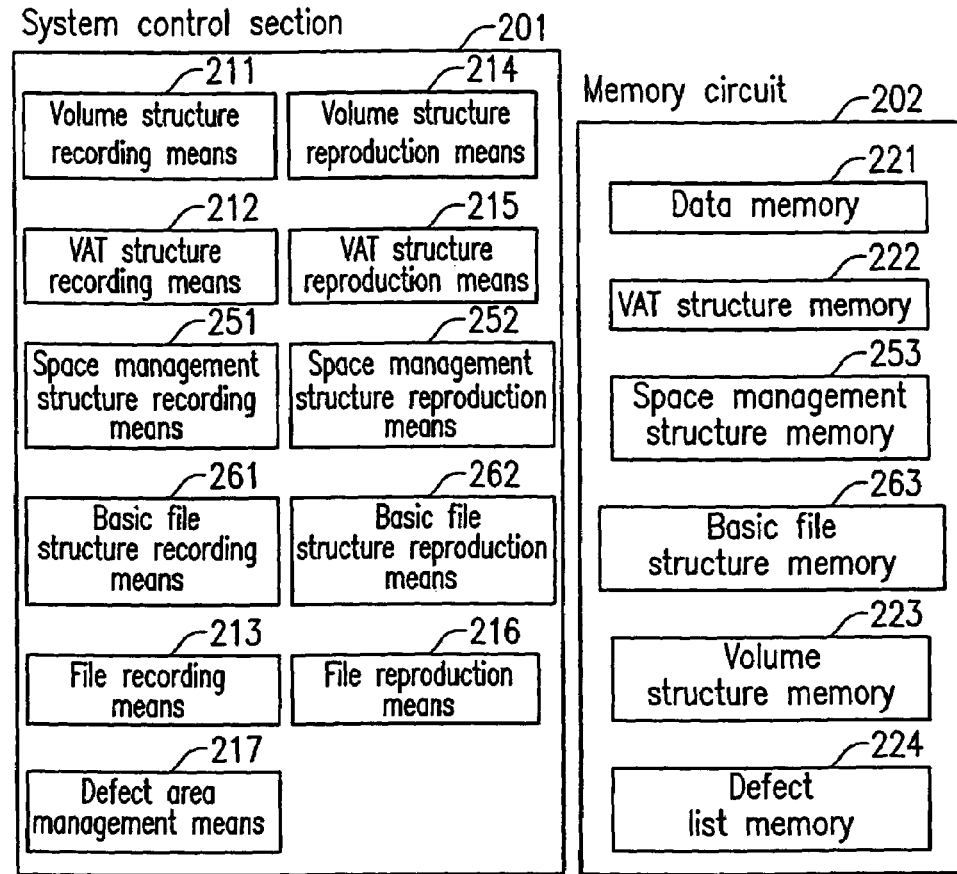
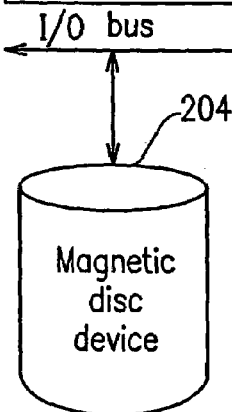
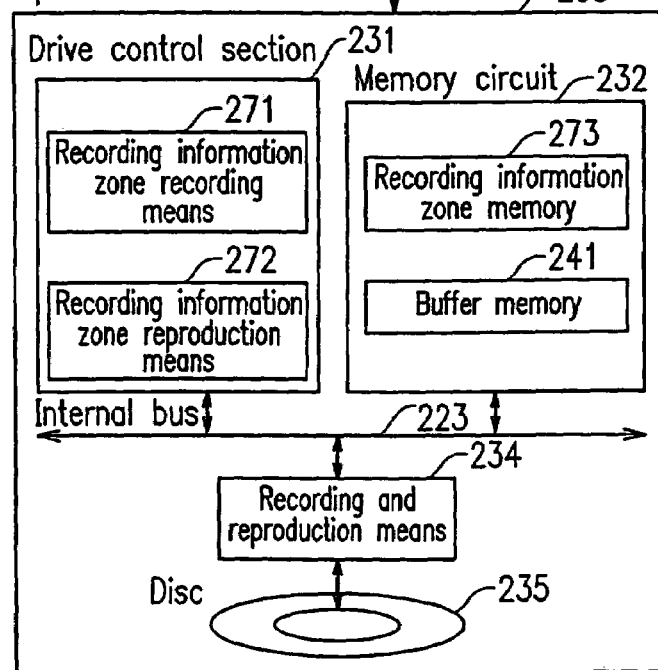

INFORMATION RECORDING MEDIUM, INFORMATION RECORDING METHOD, INFORMATION RECORDING APPARATUS, INFORMATION REPRODUCTION METHOD, AND INFORMATION REPRODUCTION APPARATUS

TECHNICAL FIELD

The present invention relates to an information recording medium, of which the number of times data can be rewritten in the same area is limited, a method and an apparatus for recording information on such an information recording medium, and a method and an apparatus for reproducing information recorded on such an information recording medium.

BACKGROUND ART

One exemplary information recording medium having a sector structure is an optical disc. As the density and capacity of the optical disc have recently been increased and more and more information has been transferred by multimedia, video and audio data are now enjoyed interactively using a plurality of strings of data recorded on an optical disc. A disc, having interactive video data recorded thereon, has an AV file including a plurality of MPEG streams as well as a control file for controlling reproduction of AV data recorded thereon.

Hereinafter, with reference to FIG. 8 illustrating a directory structure, the relationship of an AV directory structure and an AV file with a control file will be described. An AV directory at which video and audio data is recorded is located under a root directory. The AV directory has AV files (AVfile-a), (AVfile-c) and (AVfile-d) including the video and audio data itself, and a control file (Datafile) including information regarding the AV files. The control file (Datafile) includes, for example, names of titles of video and audio data recorded on the disc, the order of reproduction of data strings of each title, and positional information of I picture, P picture and the like which are necessary for special reproduction such slow reproduction, fast-forwarding and the like. In the case where one control file corresponds to one AV file, a plurality of control files may be recorded. The files are recorded under a predetermined directory with predetermined file names, such that the recording and reproduction apparatus can easily access an intended file.

With reference to FIG. 21, one exemplary data structure of a DVD-RAM disc, which is a rewritable disc, having the above-described files recorded thereon using a volume file structure defined in the ECMA167 Standards will be described. An upper portion of the figure corresponds to an inner area of the disc, and a lower portion of the figure corresponds to an outer area of the disc. Logical sector numbers are allocated from the leading end of the volume space in units of a sector. A volume structure area 101 has information recorded therein for logically handling the disc as a volume, and also has positional information of a space bit map 1021 and positional information of a file entry 1022 of a root directory. In general, each file is accessed using a logical block number, but in this example, each file is accessed using a logical sector number for simplicity of explanation.

A file structure area 1001 is an area in which a descriptor for defining a file structure is to be recorded. The space bit map 1021 is a bit map for managing, in units of a sector, an unallocated area of the volume space to which a file structure or data can be allocated. The space bit map 1021 has information indicating, in units of a logical sector, whether each area has information already recorded therein or unallocated. The file entry (root directory) 1022 has attribute information and recording position information of a root directory. A root directory 1023 has positional information of an file entry 1024 of an AV directory (AVDir) recorded under the root directory.

The file entry (AVDir) 1024 has attribute information and recording position information of an AV directory (AVDir) 1025. The AV directory (AVDir) 1025 has positional information of file entries 1026, 1027, 1028 and 1029 respectively of an AV file (AVfile-a), an AV file (AVfile-c), an AV file (AVfile-d) and a control file (Datafile).

These file entries of the AV files and the control file have attribute information and positional information of the AV file (AVfile-a), the AV file (AVfile-c), the AV file (AVfile-d) and the control file (Datafile) 1030 which are recorded in a file area 1002. The file area 1002 is an area in which data of the AV files and the control file is to be recorded.

A defect management area 1003 includes a DMA (Defect Management Area) 1004 for managing a defect and a spare area 1005 in which the content of the data which is to be recorded in the defect area is substitutively recorded. In the DMA, a spare entry for managing a defect area which is substituted for and an area for substituting for the defect area is registered. The spare entry has an address 1045 of the defect area and an address 1046 of the spare area.

Next, with reference to FIG. 22 illustrating a block diagram and FIG. 23 illustrating a flowchart, a process for writing new video and audio data over the AV file (AVfile-d) will be described. Here, the size of the video and audio data to be newly written is larger than the size of the video and audio data already recorded in the AV file (AVfile-d).

(S1201) A system control section 201 follows a control program built therein as file structure reproduction means 110 so as to acquire positional information of an unallocated area corresponding to the size that the AV file (AVfile-d) is short of, and necessary for, writing the new video and audio data from the space bit map 1021.

(S1202) The system control section 201 follows a control program built therein as file recording means 213 so as to overwrite the data in the AV file (AVfile-d), and instructs an optical disc drive device 205 to record data in the unallocated area acquired in step (S1201). The optical disc drive device 205 records the video and audio data transferred from a data memory 221 and writes the relevant control data over the data in the control file (Datafile). When a defect area is detected during the file recording processing, the optical disc drive device 205 substitutively records the content of the AV file, which is to be recorded in a defect area 1053, in the spare area 1005, and registers, in the DMA 1004, a spare entry 1051 which is information corresponding to an address 1045 of the defect area 1053 and an address 1046 of the spare area 1005. The optical disc drive device 205 notifies the system control section 201 of the completion of the recording operation.

(S1203) The system control section 201 follows a control program built therein as file structure recording means 1101 so as to reflect the recording state of the unallocated area, used in step (S1202), in the space bit map 1021.

(S1204) The system control section 201 follows a control program built therein as the file structure recording means 1101 so as to instruct the optical disc drive device 205 to record in the file structure area 1001 the updated space bit map 1021, the file entry (Datafile) 1029 of the control file (Datafile) 1030, and the file entry (AVfile-d) 1028 of the recorded AV file. The optical disc drive device 205 writes such file structures transferred from a file structure memory 1103 over the data in the file structure area, and notifies the system control section 201 of the completion of the recording operation.

In the above example of substituting for a defect area, the AV file is overwritten. The substituting is similarly performed for recording a data file such as a control file, a volume structure or a file structure.

In a lead-in area of the DVD-RAM disc, four data structure area DMAs (Defect Management Areas) for defect management performed in a sector in the volume space are provided. All such DMAs are rewritten at the corresponding position each time a defect occurs.

For simplicity of explanation, the spare area is located in the lead-in area in the above example. In an actual DVD-RAM disc, however, a spare area is provided between the lead-in area and the volume space. In the case where there is a shortage of the spare area due to frequent occurrence of substitution, an additional spare area is provided in an area external to the volume space.

In the case of a rewritable disc in which data can be rewritten in the same sector 100,000 times, no problem occurs even if data is concentratedly rewritten in the same sector. In the case of a rewritable disc to which the number of times data can be rewritten is limited to about 100 to 1000 times, however, the following problems occur when the user newly creates, rewrites, or deletes a file: since data is frequently written in the same area, defects easily occur as a result of which important data, such as a file structure or a control file, is destroyed, or data cannot be recorded on the medium.

The present invention for solving the above-described problems has an objective of sequentially moving an AV file area and a basic file structure area from an inner portion to an outer portion of a disc to which the number of times of data rewrite is limited, so as to avoid concentration of data rewrite in the same area and thus prevent occurrence of a defect.

DISCLOSURE OF THE INVENTION

An information recording medium, according to the present invention, to which the number of times of data rewrite to an identical area is limited includes a first information recording area to which data is recordable by sequential loop recording; and a second information recording area. The first information recording area includes a plurality of blocks. Each of the plurality of blocks includes an area for recording version information indicating a version of the block and an area for recording pointer information indicating a position of the second information recording area. Pointer information corresponding to latest version information is used as valid pointer information. Thus, the above-described objectives are achieved.

The second information recording area may be an area in which data is recordable by sequential loop recording.

An information recording medium, according to the present invention, to which the number of times of data rewrite to an identical area is limited includes a plurality of first information recording areas in which data is recordable by sequential loop recording; a second information recording area; and a third information recording area for recording identification information indicating which one of the plurality of first information recording areas is valid. Each of the plurality of first information recording areas includes a plurality of blocks. Each of the plurality of blocks includes an area for recording version information indicating a version of the block and an area for recording pointer information indicating a position of the second information recording area. The pointer information corresponding to latest version information is used as valid pointer information. Thus, the above-described objectives are achieved.

The identification information may be rewritten in a specific area of the third information recording area. When recording to the specific area becomes impossible, the identification information may be rewritten in an area in the third information recording area other than the specific area.

The third information recording area may be an area in which data is recordable by sequential loop recording. The third information recording area may include a plurality of blocks. Each of the plurality of blocks may include an area for recording version information indicating a version of the block. The identification information corresponding to latest version information may be used as valid identification information.

An information recording method, according to the present invention, for recording information on an information recording medium of which the number of times of data rewrite to an identical area is limited is provided. The information recording medium includes a first information recording area to which data is recordable by sequential loop recording, and a second information recording area. The first information recording area includes a plurality of block. The information recording method includes the steps of designating one of the plurality of blocks; and recording, in the designated block, version information indicating a version of the designated block and pointer information indicating a position of the second information recording area. Pointer information corresponding to latest version information is used as valid pointer information. Thus, the above-described objectives are achieved.

An information recording method, according to the present invention, for recording information on an information recording medium of which the number of times of data rewrite to an identical area is limited is provided. The information recording medium includes a plurality of first information recording areas in which data is recordable by sequential loop recording, a second information recording area, and a third information recording area. Each of the plurality of first information recording areas includes a plurality of blocks. The information recording method includes the steps of recording, in the third information recording area, identification information indicating which one of the plurality of first information recording areas is valid; designating one of the plurality of blocks included in the valid first information recording area; and recording, in the designated block, version information indicating a version of the designated block and pointer information indicating a position of the second information recording area. Pointer information corresponding to latest version information is used as valid pointer information. Thus, the above-described objectives are achieved.

An information recording apparatus, according to the present invention, for recording information on an information recording medium of which the number of times of data rewrite to an identical area is limited is provided. The information recording medium including a first information recording area to which data is recordable by sequential loop recording, and a second information recording area. The first information recording area includes a plurality of blocks. The information recording apparatus includes means for designating one of the plurality of blocks; and means for recording, in the designated block, version information indicating a version of the designated block and pointer information indicating a position of the second information recording area. Pointer information corresponding to latest version information is used as valid pointer information. Thus, the above-described objectives are achieved.

An information recording apparatus, according to the present invention, for recording information on an information recording medium of which the number of times of data rewrite to an identical area is limited is provided. The information recording medium includes a plurality of first information recording areas in which data is recordable by sequential loop recording, a second information recording area, and a third information recording area. Each of the plurality of first information recording areas includes a plurality of blocks. The information recording apparatus includes means for recording, in the third information recording area, identification information indicating which one of the plurality of first information recording areas is valid; means for designating one of the plurality of blocks included in the valid first information recording area; and means for recording, in the designated block, version information indicating a version of the designated block and pointer information indicating a position of the second information recording area. Pointer information corresponding to latest version information is used as valid pointer information. Thus, the above-described objectives are achieved.

An information reproduction method, according to the present invention, for reproducing information recorded on an information recording medium of which the number of times of data rewrite to an identical area is limited is provided. The information recording medium includes a first information recording area to which data is recordable by sequential loop recording, and a second information recording area. The first information recording area includes a plurality of blocks. In at least one of the plurality of blocks, version information indicating a version of the block and pointer information indicating a position of the second information recording area are recorded. The information reproduction method includes the steps of designating one of the plurality of blocks; and determining whether or not to acquire the pointer information recorded in the designated block in accordance with the version information recorded in the designated block. Pointer information corresponding to latest version information is used as valid pointer information. Thus, the above-described objectives are achieved.

An information reproduction method, according to the present invention, for reproducing information recorded on an information recording medium of which the number of times of data rewrite to an identical area is limited is provided. The information recording medium includes a plurality of first information recording areas in which data is recordable by sequential loop recording, a second information recording area, and a third information recording area. Each of the plurality of first information recording areas includes a plurality of blocks. In at least one of the plurality of blocks, version information indicating a version of the block and pointer information indicating a position of the second information recording area are recorded. In the third information recording area, identification information indicating which one of the plurality of first information recording areas is valid is recorded. The information reproduction method includes the steps of acquiring the identification information from the third information recording area; designating one of the plurality of blocks included in the valid first information recording area which is indicated by the identification information; and determining whether or not to acquire the pointer information recorded in the designated block in accordance with the version information recorded in the designated block. Pointer information corresponding to latest version information is used as valid pointer information. Thus, the above-described objectives are achieved.

An information reproducing apparatus, according to the present invention, for reproducing information recorded on an information recording medium of which the number of times of data rewrite to an identical area is limited is provided. The information recording medium includes a first information recording area to which data is recordable by sequential loop recording, and a second information recording area. The first information recording area includes a plurality of blocks. In at least one of the plurality of blocks, version information indicating a version of the block and pointer information indicating a position of the second information recording area are recorded. The information reproduction apparatus includes means for designating one of the plurality of blocks; and means for determining whether or not to acquire the pointer information recorded in the designated block in accordance with the version information recorded in the designated block. Pointer information corresponding to latest version information is used as valid pointer information. Thus, the above-described objectives are achieved.

An information reproduction apparatus, according to the present invention, for reproducing information recorded on an information recording medium of which the number of times of data rewrite to an identical area is limited is provided. The information recording medium includes a plurality of first information recording areas in which data is recordable by sequential loop recording, a second information recording area, and a third information recording area. Each of the plurality of first information recording areas includes a plurality of blocks. In at least one of the plurality of blocks, version information indicating a version of the block and pointer information indicating a position of the second information recording area are recorded. In the third information recording area, identification information indicating which one of the plurality of first information recording areas is valid is recorded. The information reproduction apparatus includes means for acquiring the identification information from the third information recording area; means for designating one of the plurality of blocks included in the valid first information recording area which is indicated by the identification information; and means for determining whether or not to acquire the pointer information recorded in the designated block in accordance with the version information recorded in the designated block. Pointer information corresponding to latest version information is used as valid pointer information. Thus, the above-described objectives are achieved.

BRIEF DESCRIPTION OF THE DRAWINGS

FIG. 2 is a block diagram illustrating a structure of an information recording and reproduction apparatus according to Example 1.

BEST MODE FOR CARRYING OUT THE INVENTION (Definition of Terms)

The terms used in this specification will be defined as follows.

(1) "Sequential loop recording" refers to searching for unallocated areas in a predetermined recording area, allocating the areas based on the search result, and recording data in the allocated areas. Searching for unallocated areas in the predetermined recording area is achieved by searching for an unallocated area in a certain direction from a predetermined position and, in the case where the search reaches the trailing end of the predetermined recording area, searching for the next unallocated area from the leading end of the predetermined recording area. In this specification, "sequential loop recording" is also referred to as "loop recording in a certain direction". These terms are synonymous.

(2) "AV data" refers to data indicating at least one of video data and audio data.

(3) An "AV file" refers to a file including AV data.

1. EXAMPLE 1

In Example 1, an information recording medium, of which the number of times data can be rewritten in the same area is limited, a method and an apparatus for recording information on such an information recording medium, and a method and an apparatus for reproducing information recorded on such an information recording medium will be described.

This example assumes an information recording medium to which the number of times data can be rewritten is limited to about 100 to 1000 times. The present invention is also applicable to an information recording medium to which the number of times data can be rewritten is limited to a smaller number of times or a larger number of times. The information recording medium may be, for example, any type of information recording medium (for example, an optical disc, a magnetic disc, or a magneto-optical disc). In this example, the information recording medium is an optical disc.

In this example, information to be recorded on the information recording medium or information to be reproduced from the information recording medium is a file managed using a file structure based on the UDF (Universal Disk Format) conforming to the ECMA167 Standards.

In the following description, a descriptor, a pointer and the like which are recorded on the information recording medium as a volume file structure have a data structure defined by the ECMA167 or UDF (Universal Disk Format) Standards unless otherwise described in detail.

1.1 Data Structure of an Optical Disc

Figure 1:
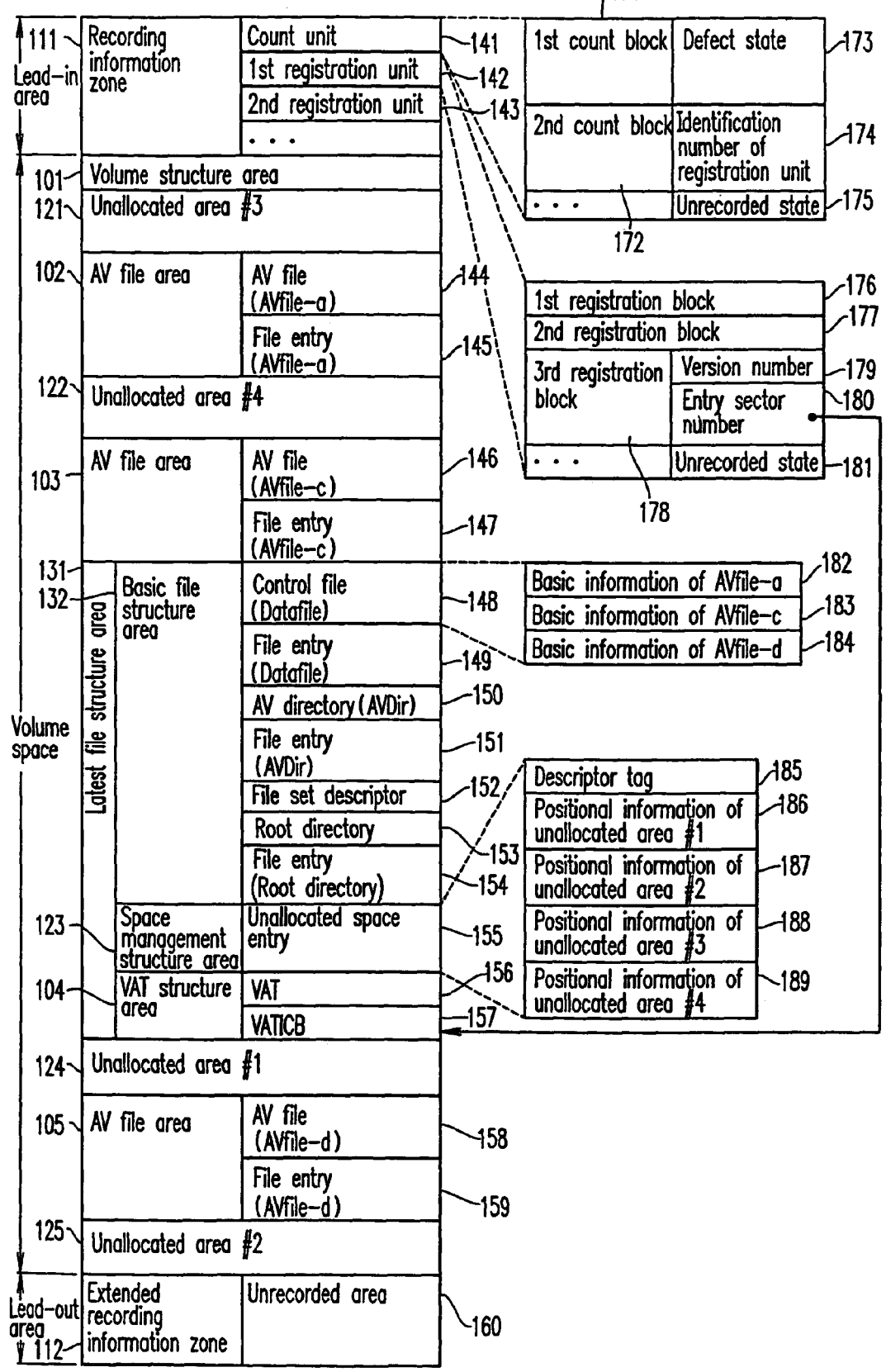
FIG. 1 shows a data structure of an information recording medium according to Example 1.

FIG. 1 shows an exemplary data structure of an optical disc.

The optical disc has a lead-in area, a volume space, and a lead-out area formed thereon. The lead-in area is provided in an inner portion of the optical disc. The lead-out area is provided in an outer portion of the optical disc. The volume space is interposed between the lead-in area and the lead-out area.

The lead-in area has a recording information zone 111 allocated thereto. The recording information zone 111 includes a count unit and a plurality of registration units.

The volume space has a volume structure area 101, a latest file structure area 131, and AV file areas 102, 103 and 105 allocated thereto. Unallocated areas 121, 122, 124 and 125 are areas having no valid data allocated thereto.

The lead-out area has an extended recording information zone 112 allocated thereto.

1.2 Structure of an Information Recording and Reproduction Apparatus

FIG. 2 shows an exemplary information recording and reproduction apparatus.

The information recording and reproduction apparatus includes a system control section 201, a memory circuit 202, a magnetic disc device 204, and an optical disc drive device 205. These elements are connected to each other via an I/O bus 203.

The system control section 201 includes volume structure recording means 211 for recording a volume structure, volume structure reproduction means 214 for reproducing the volume structure, VAT structure recording means 212 for recording a VAT structure, VAT structure reproduction means 215 for reproducing the VAT structure, space management structure recording means 251 for recording a space management structure, space management structure reproduction means 252 for reproducing the space management structure, basic file structure recording means 261 for recording a basic file structure, basic file structure reproduction means 262 for reproducing the basic file structure, file recording means 213 for recording file data, file reproduction means 216 for reproducing the file data, and defect area management means 217. The system control section 201 is implemented by, for example, a microprocessor including a control program and an arithmetic memory.

The memory circuit 202 includes a data memory 221 for temporarily storing a file, a VAT structure memory 222 used for arithmetic or temporary storage of the VAT structure, a space management structure memory 253 used for arithmetic or temporary storage of the space management structure, a basic file structure memory 263 used for arithmetic or temporary storage of the basic file, a volume structure memory 223 used for arithmetic or temporary storage of the volume structure, and a defect list memory 224.

The optical disc drive device 205 includes a drive control section 231, a memory circuit 232, and recording and reproduction means 234. These elements are connected to each other via an internal bus 233.

The drive control section 231 includes recording information zone recording means 271 for recording information in the recording information zone, and recording information zone reproduction means 272 for reproducing information recorded in the recording information zone.

The memory circuit 232 includes a recording information zone memory 273 used for arithmetic or temporary storage of the information to be recorded in the recording information zone, and a buffer memory 241.

The recording and reproduction means 234 records information on an optical disc 235 or reproduces information recorded on the optical disc 235.

The information recording and reproduction apparatus shown in FIG. 2 has both a function of recording information on the optical disc 235 and a function of reproducing information recorded on the optical disc 235. Accordingly, the information recording and reproduction apparatus shown in FIG. 2 can be regarded as an "information recording apparatus" for recording information on the optical disc 235. In this case, the elements which are not relevant to the function of recording information on the optical disc 235 may be omitted. Alternatively, the information recording and reproduction apparatus shown in FIG. 2 can be regarded as an "information reproduction apparatus" for reproducing information recorded on the optical disc 235. In this case, the elements which are not relevant to the function of reproducing information recorded on the optical disc 235 may be omitted.

1.3 Formatting Processing

Figure 3:
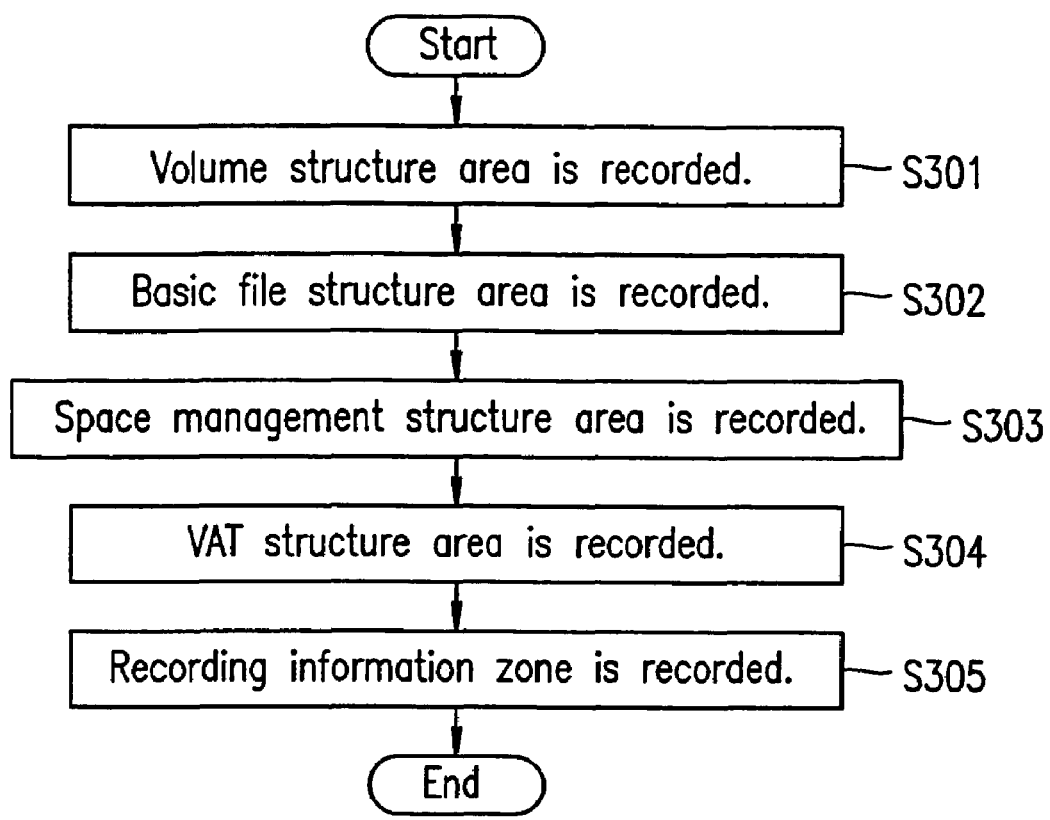
FIG. 3 is a flowchart illustrating a procedure of formatting processing in Example 1.

FIG. 3 shows a procedure of formatting processing for formatting the optical disc 235. The formatting processing is performed by the information recording and reproduction apparatus shown in FIG. 2. Hereinafter, the steps shown in FIG. 3 will be described in detail.

(S301) The system control section 201 creates a volume structure including pre-designated parameters such as a volume name, and stores the volume structure in the volume structure memory 223 of the memory circuit 202. The system control section 201 further instructs the optical disc drive device 205 to record the volume structure, stored in the volume structure memory 223, on the optical disc 235. The above-described operations of the system control section 201 are achieved by, for example, executing a control program built in the system control section 201 as the volume structure recording means 211. The optical disc drive device 205 records the volume structure at a predetermined position of the optical disc 235, and when the recording operation is completed, notifies the system control section 201 of the completion of the recording operation.

(S302) The system control section 201 creates a basic file structure, and stores the basic file structure in the basic file structure memory 263 of the memory circuit 202. The system control section 201 further instructs the optical disc drive device 205 to record the basic file structure, stored in the basic file structure memory 263, on the optical disc 235. The above-described operations of the system control section 201 are achieved by, for example, executing a control program built in the system control section 201 as the basic file structure recording means 261. The optical disc drive device 205 records the basic file structure at a predetermined position of the optical disc 235, and when the recording operation is completed, notifies the system control section 201 of the completion of the recording operation.

(S303) The system control section 201 creates a space management structure, and stores the space management structure in the space management structure memory 253 of the memory circuit 202. At this point, positional information of an unallocated area 422 is registered in a space entry 453 in consideration of the capacity of the VAT structure area allocated in step (S304). The system control section 201 further instructs the optical disc drive device 205 to record the space management structure, stored in the space management structure memory 253, on the optical disc 235. The above-described operations of the system control section 201 are achieved by, for example, executing a control program built in the system control section 201 as the space management structure recording means 251. The optical disc drive device 205 records the space management structure at a predetermined position of the optical disc 235, and when the recording operation is completed, notifies the system control section 201 of the completion of the recording operation.

(S304) The system control section 201 creates a VAT structure, and stores the VAT structure in the VAT structure memory 222 of the memory circuit 202. The system control section 201 further instructs the optical disc drive device 205 to record the VAT structure, stored in the VAT structure memory 222, on the optical disc 235. The above-described operations of the system control section 201 are achieved by, for example, executing a control program built in the system control section 201 as the VAT structure recording means 212. The optical disc drive device 205 records the VAT structure at a predetermined position of the optical disc 235, and when the recording operation is completed, notifies the system control section 201 of the completion of the recording operation.

(S305) The system control section 201 instructs the optical disc drive device 205 to record data in the recording information zone. The drive control section 231 creates a first registration block 176 including an entry sector number (pointer information) indicating the position of the trailing end of the latest file structure area and a version number (version information) for identifying a valid registration block, stores the first registration block 176 in the recording information zone memory 273 of the memory circuit 232, and records the first registration block 176 at a predetermined position of the optical disc 235. For example, the drive control section 231 records the first registration block 176 in a first registration unit 142, and records, at the leading end of the count unit, the count block having the identification number of the registration unit in which data has been recorded. The above-described operations of the drive control section 231 are achieved by, for example, executing a control program built in the drive control section 231 as the recording information zone recording means 271. When the recording operation is completed, the optical disc drive device 205 notifies the system control section 201 of the completion of the recording operation.

In this example, the recording operation of the registration block and the recording operation of the count block are performed separately, but these recording operations may be performed concurrently.

Figure 4:
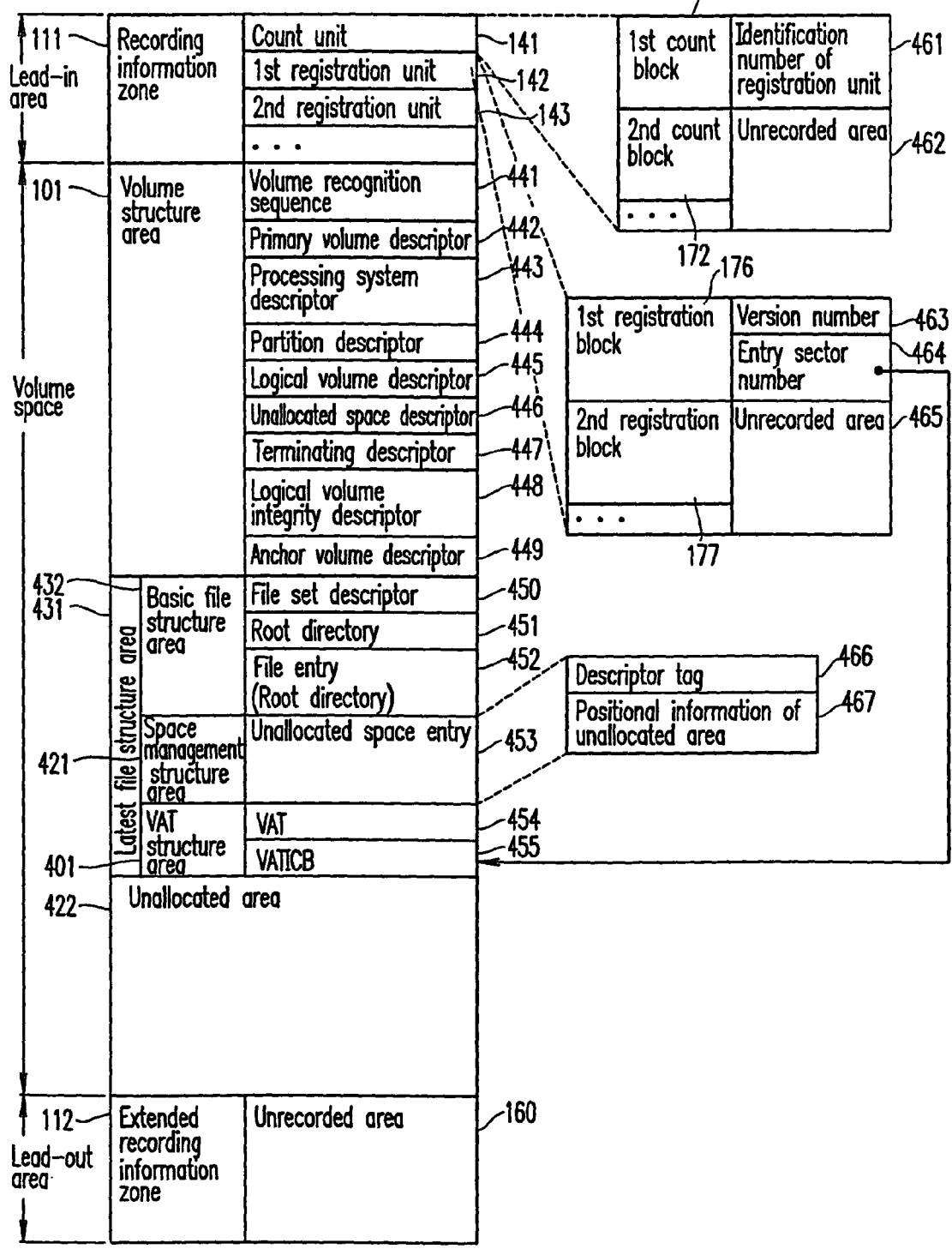
FIG. 4 shows a data structure of an information recording medium after the formatting processing is performed in Example 1.

FIG. 4 shows a structure of data recorded on the optical disc 235 after the formatting processing is performed.

The volume structure area 101 has the volume structure recorded therein. The volume structure includes a volume recognition sequence 441 having recognition information of a volume, a primary volume descriptor 442 having attribute information of the volume, a processing system descriptor 443 having information for the processing system, a partition descriptor 444 having partition information, a logical volume descriptor 445 having recognition information of a logical volume, an unallocated space descriptor 446 having information of an unallocated area in the volume space, an terminating descriptor 447 indicating a trailing end of a basic descriptor sequence, a logical volume integrity descriptor 448 having information of an integrity state of the logical volume, and an anchor volume descriptor pointer 449 having information on access start to the volume. The information recorded in the volume structure area is not limited to the above-described order or types.

In a basic file structure area 432 of a latest file structure area 431, the basic file structure is recorded. The basic file structure includes a file set descriptor 450, a root directory 451, and a file entry (root directory) 452.

In a space management structure area 421 of the latest file structure area 431, the space management structure is recorded. The space management structure includes the unallocated space entry 453.

In a VAT structure area 401 of the latest file structure area 431, the VAT structure is recorded. The VAT structure includes a VAT 454 and a VATICB 455. The VAT 454 and the VATICB 455 are data structures defined by the UDF Standards. A recording position of data on an optical disc is indicated using a virtual address in a virtual address space and a logical address in a logical address space. The VAT 454 retains the correspondence between virtual addresses and logical addresses. The VATICB 455 indicates the recording position of the VAT 454. The VATICB 455 is allocated to a sector at the trailing end of the area in which the data is recorded.

The recording information zone 111 includes a count unit 141 for designating the number of a valid registration unit, and a plurality of registration units including the first registration unit 142 and a second registration unit 143. In the count unit 141, only a first count block 171 indicating the identification number of the first registration unit 142 is recorded. In the first registration unit 142, the first registration block 176 having an entry sector number 464 indicating the positional information of the latest file structure area 431 is recorded.

Data is not recorded in the second count block et seq. in the count unit 141. Data is not recorded in the second count block et seq. in the first registration unit 142. Data is not recorded in the second registration unit 143 et seq.

1.4 File Recording Processing

Figure 5:
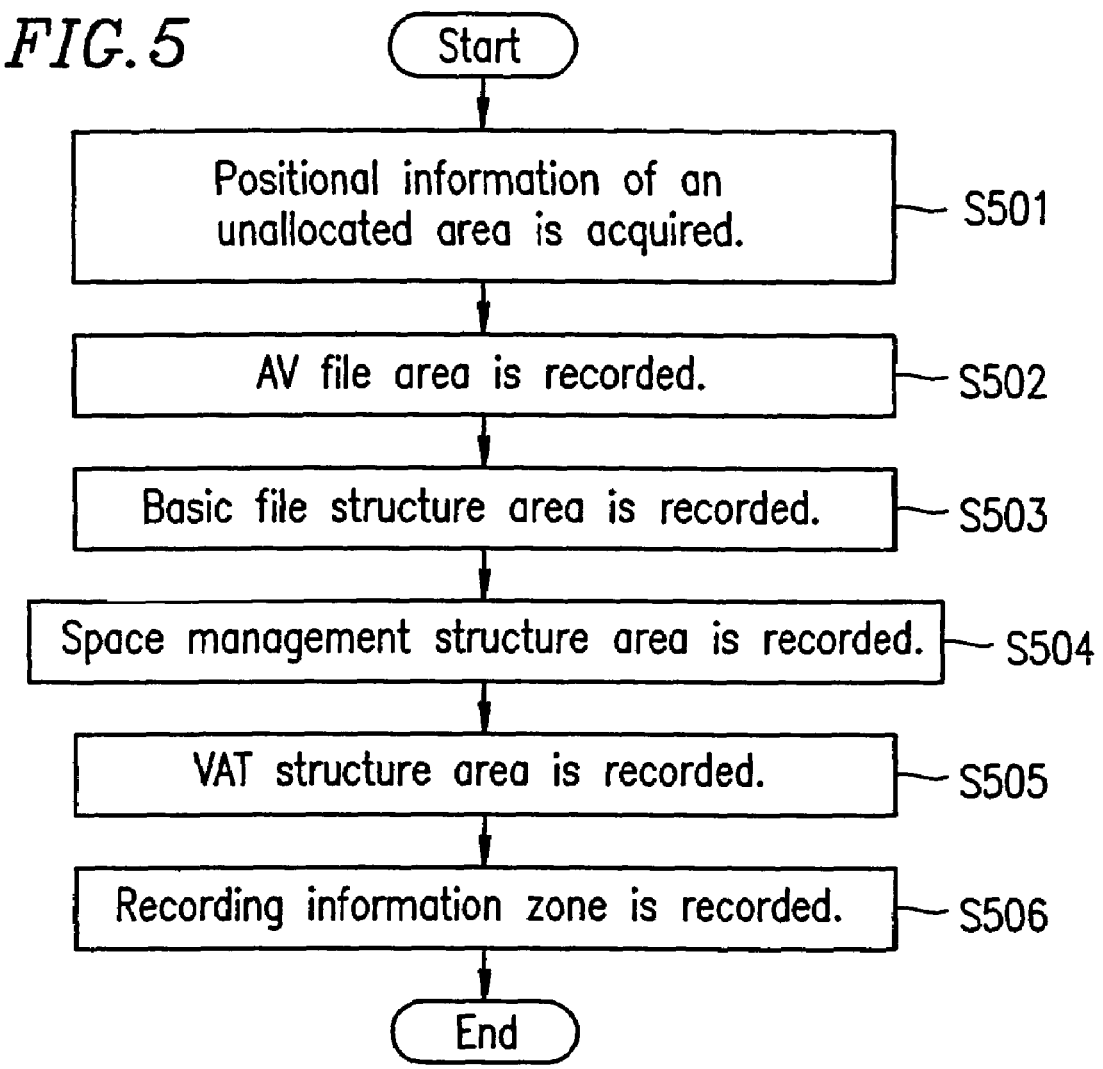
FIG. 5 is a flowchart illustrating a procedure of file recording processing in Example 1.

FIG. 5 shows a procedure of file recording processing for recording a file on the optical disc 235. The file recording processing is performed by the information recording and reproduction apparatus shown in FIG. 2. Hereinafter, the steps shown in FIG. 5 will be described in detail. In the following example, the AV file (AVfile-a), the AV file (AVfile-b), and a control file thereof are recorded on the optical disc 235 having the data structure shown in FIG. 4.

(S501) The system control section 201 acquires positional information 467 of an unallocated area from the unallocated space entry 453 which has been read to the space management structure memory 253. The above-described operation of the system control section 201 is achieved by, for example, executing a control program built in the system control section 201 as the space management structure recording means 251.

(S502) The system control section 201 allocates the unallocated area based on the positional information of the unallocated area acquired in step (S501), and instructs the optical disc drive device 205 to record data of an AV file (AVfile-a) 641 in the allocated area. The system control section 201 further creates a file entry (AVfile-a) 642 of the AV file (AVfile-a) 641, stores the file entry in the data memory 221, and instructs the optical disc drive device 205 to record the file entry in an area continuous from the area in which the data of the AV file (AVfile-a) 641 has been recorded. Similarly, the system control section 201 instructs the optical disc drive device 205 to record data of an AV file (AVfile-b) 643 and a file entry (AV file-b) 644 thereof in the continuous areas. The above-described operations of the system control section 201 are achieved by, for example, executing a control program built in the system control section 201 as the file recording means 213. The optical disc drive device 205 records the above-mentioned data at a predetermined position of the optical disc 235, and when the recording operation is completed, notifies the system control section 201 of the completion of the recording operation.

(S503) The system control section 201 creates a basic file structure, and stores the basic file structure in the basic file structure memory 263 of the memory circuit 202. The system control section 201 further instructs the optical disc drive device 205 to record the basic file structure, stored in the basic file structure memory 263, on the optical disc 235. The above-described operations of the system control section 201 are achieved by, for example, executing a control program built in the system control section 201 as the basic file structure recording means 261. The optical disc drive device 205 records the basic file structure at a predetermined position of the optical disc 235, and when the recording operation is completed, notifies the system control section 201 of the completion of the recording operation.

(S504) The system control section 201 creates a space management structure, and stores the space management structure in the space management structure memory 253 of the memory circuit 202. At this point, positional information 666 of an unallocated area #1 (623) and positional information 667 of an unallocated area #2 (621) are registered in an unallocated space entry 652 in consideration of the capacity of a VAT structure area 602 allocated in step (S505). The system control section 201 further instructs the optical disc drive device 205 to record the space management structure, stored in the space management structure memory 253, on the optical disc 235. The above-described operations of the system control section 201 are achieved by, for example, executing a control program built in the system control section 201 as the space management structure recording means 251. The optical disc drive device 205 records the space management structure at a predetermined position of the optical disc 235, and when the recording operation is completed, notifies the system control section 201 of the completion of the recording operation.

(S505) The system control section 201 creates a VAT structure, and stores the VAT structure in the VAT structure memory 222 of the memory circuit 202. The system control section 201 further instructs the optical disc drive device 205 to record the VAT structure, stored in the VAT structure memory 222, on the optical disc 235. The above-described operations of the system control section 201 are achieved by, for example, executing a control program built in the system control section 201 as the VAT structure recording means 212. The optical disc drive device 205 records the VAT structure at a predetermined position of the optical disc 235, and when the recording operation is completed, notifies the system control section 201 of the completion of the recording operation.

(S506) The system control section 201 instructs the optical disc drive device 205 to record data in the recording information zone. The drive control section 231 creates a second registration block 177 including an entry sector number (pointer information) indicating the position of the trailing end of the latest file structure area and a version number (version information) for identifying a valid registration block, stores the second registration block 177 in the recording information zone memory 273 of the memory circuit 232, and records the second registration block 177 at a predetermined position (an area continuous from the area in which the first registration block 176 has been recorded) of the optical disc 235. The above-described operations of the drive control section 231 are achieved by, for example, executing a control program built in the drive control section 231 as the recording information zone recording means 271. When the recording operation is completed, the optical disc drive device 205 notifies the system control section 201 of the completion of the recording operation.

Figure 6:
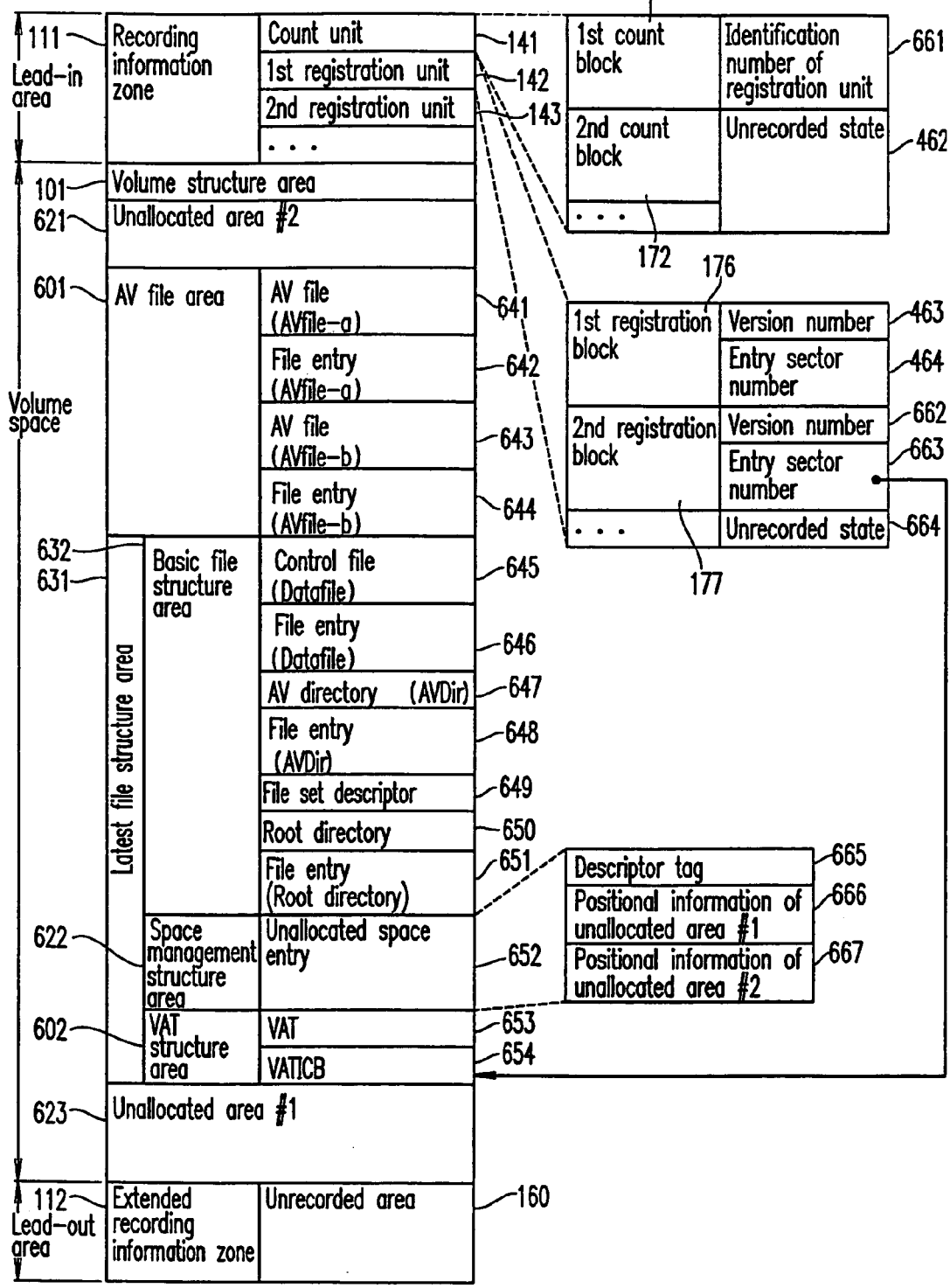
FIG. 6 shows a data structure of an information recording medium after the file recording is performed in Example 1.

FIG. 6 shows a structure of data recorded on the optical disc 235 after the file recording processing is performed.

The volume structure area 101 has the volume structure recorded therein. The detail of the volume structure is as described with reference to FIG. 4.

An AV file area 601 has the AV file (AVfile-a) 641, a file entry (AVfile-a) 642 thereof, the AV file (AVfile-b) 643, and a file entry (AVfile-b) 644 thereof recorded therein.

In a basic file structure area 632 of a latest file structure area 631, the basic file structure is recorded. The basic file structure includes a control file (Datafile) 645 having information relevant to the AV files, a file entry (Datafile) 646 thereof, an AV directory (AVDir) 647, a file entry (AVDir) 648, a file set descriptor 649, a root directory 650, and a file entry (root directory) 651 thereof. The AV directory (AVDir) 647 includes positional information of the file entry (AVfile-a) 642 of the AV file (AVfile-a) 641 and positional information of the file entry (AVfile-b) 644 of the AV file (AVfile-b) 643.

The file set descriptor 649, the root directory 650, and the file entry (root directory) 651 are recorded at a new recording position (logical address). By updating a logical address in the VAT 653 describing the correspondence between the virtual addresses and the logical addresses, the new recording position can be accessed using the same virtual address. For example, the recording position of the file set descriptor 649 designated by the logical volume descriptor 445 is designated using a virtual address. Even when the file set descriptor 649 is recorded at a new recording position (logical address), the new recording position of the file set descriptor 649 can be accessed by updating the logical address in the VAT 653 describing the correspondence between the virtual addresses and the logical addresses.

In a space management structure area 622 of the latest file structure area 631, the space management structure is recorded. The space management structure includes the unallocated space entry 652.

In the VAT structure area 602 of the latest file structure area 631, a VAT structure is recorded. The VAT structure includes the VAT 653 and the VATICB 654.

The recording information zone 111 includes the count unit 141 for designating the number of a valid registration unit, and a plurality of registration units including the first registration unit 142 and the second registration unit 143. In the count unit 141, only the first count block 171 indicating the identification number of the first registration unit 142 is recorded. In the first registration unit 142, the first registration block 176, and the second registration block 177 having an entry sector number 663 indicating the positional information of the latest file structure area 631 are recorded. It is recognized that the second registration block 177 is the latest registration block having the valid entry sector number 663, by comparing a version number 463 of the first registration block 176 and a version number 662 of the second registration block 177.

1.5 Space Management Structure

Hereinafter, with reference to FIG. 1, the space management structure will be described.

A space management structure is a structure for managing positional information of an unallocated area which is a continuous area existing in the volume space and in which data is recordable. The space management structure is necessarily recorded after some data is recorded on an optical disc.

An unallocated space entry 155, which is a space management structure, includes a descriptor tag 185 indicating that the entry is an unallocated space entry, and positional information of at least one unallocated area existing in the volume space (in the example shown in FIG. 1, positional information 186 of an unallocated area #1, positional information 187 of an unallocated area #2, positional information 188 of an unallocated area #3, and positional information 189 of an unallocated area #4).

In order to record latest information while moving the latest information from an inner portion to an outer portion of the optical disc, positional information of unallocated areas is registered in the unallocated space entry 155, such that the positional information of the unallocated area external to and closest to the latest file structure area 131 is registered in the innermost portion of the unallocated space entry 155 and then the positional information of the unallocated area external to and next closest to the latest file structure area 131 is registered in the second innermost portion of the unallocated space entry 155. When the positional information of the outermost unallocated area is registered in the unallocated space entry 155, the positional information of unallocated areas is registered in the unallocated space entry 155, such that the positional information of the innermost unallocated area is registered in the next innermost portion of the unallocated space entry 155 and then the positional information of the next innermost unallocated area is registered in the next innermost portion of the unallocated space entry 155.

In the example shown in FIG. 1, the unallocated area #1 (124) is external to and closest to the latest file structure area 131. Accordingly, the positional information 186 of the unallocated area #1 (124) is registered in the unallocated space entry 155 as the first positional information.

Next, the positional information 187 of the unallocated area #2 (125) located at the trailing end of the volume space is registered in the unallocated space entry 155 as the second positional information. Next, the positional information 188 of the innermost unallocated area #3 (121) in the volume space is registered in the unallocated space entry 155 as the third positional information. Finally, the positional information 189 of the unallocated area #4 (122) is registered in the unallocated space entry 155 as the fourth positional information. In this manner, the positional information of the unallocated areas is registered in the unallocated space entry 155 in the order of the unallocated area #1 (124), the unallocated area #2 (125), the unallocated area #3 (121), and the unallocated area #4 (122).

By registering the unallocated areas in the unallocated space entry 155 in the above-described order and recording the data in the unallocated areas in the order of registration in the unallocated space entry 155, data can be recorded while moving the latest file structure area on the optical disc. As a result, concentration of data rewrite in a specific area can be avoided, and thus occurrence of defects and data destruction can be prevented.

In the case where the data recorded on the optical disc is deleted or edited, an area which has been used so far becomes unnecessary. Positional information of the area which becomes unnecessary is registered in the unallocated space entry 155 as positional information of a new unallocated area. Where in the unallocated space entry 155 the positional information of the newly registered unallocated area is to be located is calculated from the positional information of the unallocated areas already registered in the unallocated space entry 155. As a result, the positional information of the new unallocated area is inserted at an appropriate position in the unallocated space entry 155.

In this example, the location of registration of the positional information of an unallocated area in the unallocated space entry 155 is determined based on the positions of the unallocated areas in the volume space. Alternatively, at the time when an area becomes unnecessary because of deletion of data, the positional information of the area which becomes unnecessary may be registered at the trailing end of the unallocated space entry 155 as positional information of a new unallocated area. Still alternatively, the location of registration of the positional information of an unallocated area in the unallocated space entry 155 may be determined based on the time at which the area which becomes unnecessary is recovered as a new unallocated area. By this method also, concentration of data rewrite in a specific area can be avoided.

The method of recording data from an inner portion to an outer portion according to the present invention is also applicable to a write once type disc.

Figure 8:
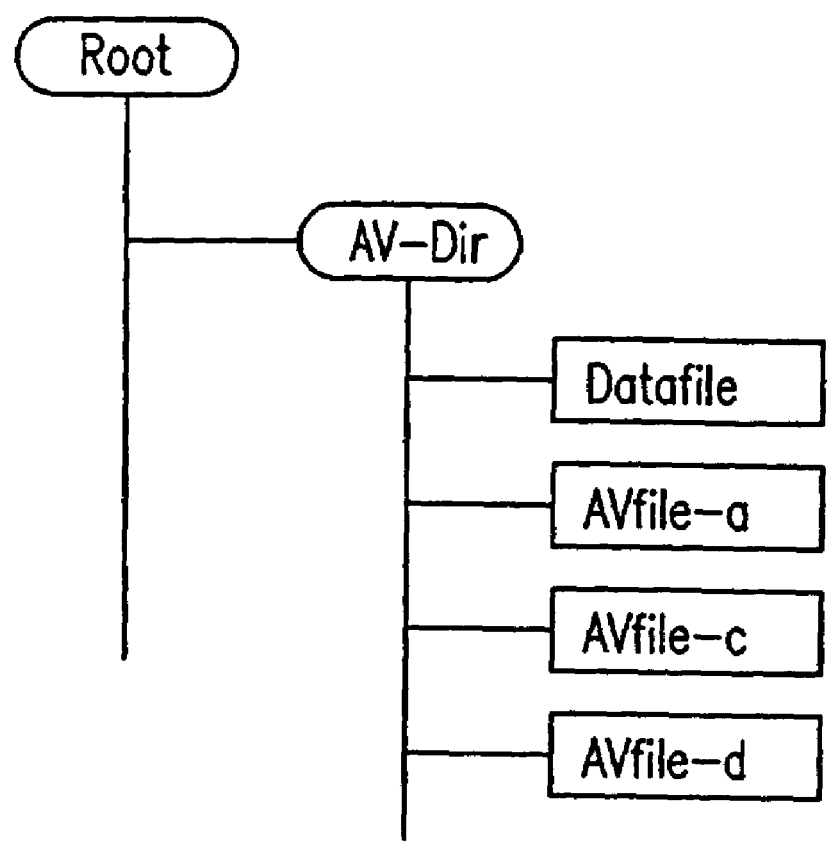
FIG. 8 shows a directory structure for managing a file recorded on a disc.

In FIG. 8, the case where there is one control file for which data reliability is required is described. Alternatively, a plurality of control files may be recorded on the optical disc. In this case, the control files may be recorded in the basic file structure area or the AV file area. When the size of the control files is small or when the number of the control files is small, the control files are preferably recorded in the basic file structure area. The reason is that the control files are easily accessed when recorded in the basic file structure area. When the size of the control files is large or when the number of the control files is large, the control files are preferably recorded in the AV file area. The reason is that the size of the latest file structure area can be kept small in this way. It is clear that by recording the control files and file entries thereof in the AV file area, concentration of data rewrite in a specific area at the time of updating the control files can be avoided.

It is possible to perform loop recording in a certain direction based on the recording position information which indicates the next recording position designated by the entry sector number. The positional information of the area where data is recordable is acquired from the space management structure.

1.6 Data Structure of the Recording Information Zone

Figure 9:
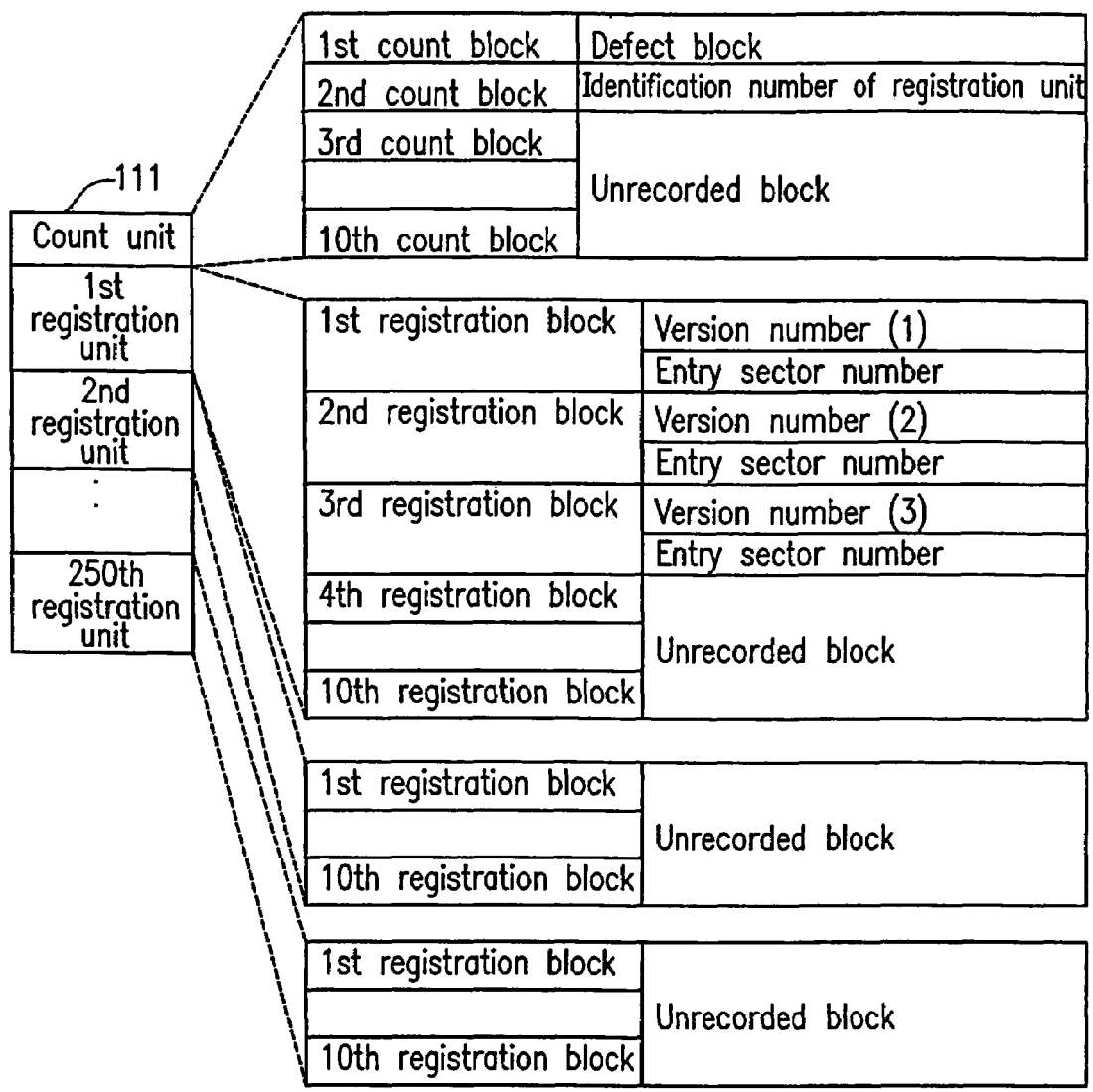
FIG. 9 shows a data structure of a recording information zone in Example 1.

FIG. 9 shows an exemplary data structure of the recording information zone 111. In the example shown in FIG. 9, the recording information zone 111 includes one count unit and 250 registration units.

The count unit includes 10 count blocks. Each of the 10 count blocks is, for example, formed as an ECC block which is the minimum recording unit. Recorded in one of the 10 count blocks is identification information which indicates which one of the 250 registration units is valid (for example, the identification number of the registration unit to which the registration block having the valid entry sector number recorded therein belongs). The count unit is used for searching for a valid registration unit from the 250 registration units. Use of the count unit allows the latest entry sector number to be acquired by reading only one valid registration unit, without reading all the registration units.

Each count block is rewritten when the identification number of the valid registration unit is changed. Accordingly, the number of times the count block is rewritten is extremely small as compared to the number of times the registration block is rewritten.

The 10 count blocks included in the count unit are used sequentially from the leading count block (first count block). One count block is repeatedly used until the count block becomes unrecordable. The count block becomes unrecordable for reasons that, for example, data is rewritten by the number of times exceeding the rewritable number of times, and the count block is placed in a defect state due to adherence of dust or the like. When the first count block becomes unrecordable, a second count block is used. When the second count block becomes unrecordable, a third count block is used. In this manner, each count block is rewritten until the count block becomes unrecordable. When the count block becomes unrecordable, the next count block is used. Accordingly, search in the count blocks can be performed at higher speed as the number of times the data has been rewritten is smaller.

Each of the first registration unit through the 250th registration unit includes 10 registration blocks. Each of the 10 registration blocks is formed as an ECC block which is the minimum recording unit. Each of the 10 registration blocks includes an area used for recording a version number (version information) indicating a version of the registration block and an area used for recording an entry sector number (pointer information) indicating the trailing end of the latest file structure area.

Each time data is recorded in the latest file structure area, the version number and the entry sector number are recorded in one registration block selected among the first to the tenth registration blocks in one registration unit. Each time data is recorded in the latest file structure area, the registration block, in which the version number and the entry sector number are recorded, is changed. For example, when the data is recorded for the first time in the latest file structure area, the version number and the entry sector number are recorded in the first registration block; and data is recorded for the second time in the latest file structure area, the version number and the entry sector number are recorded in the second registration block. In this manner, the version number and the entry sector number are recorded in one registration block, sequentially from the first registration block to the tenth registration block. After the version number and the entry sector number are recorded in the tenth registration block, the version number and the entry sector number are recorded in the first registration block again (data in the first registration block is overwritten). Then, again, the version number and the entry sector number are recorded in one registration block, sequentially from the first registration block to the tenth registration block (data in each registration block is overwritten).

By recording the version number and the entry sector number in the registration blocks one by one in this manner, concentration of data rewrite in a specific registration block can be avoided.

The position indicated by the entry sector number (pointer information) is not limited to the position of the trailing end of the latest file structure area. The position indicated by the entry sector number (pointer information) may be any position (for example, a predetermined position) in any area (for example, the second information recording area) on the optical disc 235. The second information recording area may be an area where data is recordable by sequential loop recording.

In this example, data is sequentially recorded repeatedly in each of the 250 registration units. Namely, each of the 250 registration units is an example of the first information recording area in which data is recordable by sequential loop recording. By sequentially recording data repeatedly in each of a plurality of divided areas in this manner, the reliability of all the areas can be improved and the reading speed from each area can be raised.

The latest registration block is managed so as to have the largest version number in the registration unit to which the latest registration block belongs. The largest version number indicates the latest version information. The entry sector number (pointer information) corresponding to the largest version number (latest version information) is used as the valid entry sector number (valid pointer information).

In the example shown in FIG. 9, the third registration block having version number (3) is the latest registration block. By causing the registration unit to include 10 registration blocks in this manner, the latest registration block can be recognized only by reading data from the maximum of 10 registration blocks.

When one or more registration blocks become unusable in one registration unit, the next registration unit is used. For example, when one or more registration blocks become unusable in the first registration unit (or when the version number of the registration block reaches a certain value in the first registration unit), the second registration unit is used. The valid registration unit is identified by the count unit. Accordingly, it is not necessary to search for all the 250 registration units in order to identify the valid registration unit.

By providing a reserve recording information zone, in which a copy of the information recorded in the recording information zone 111 is recorded, in the extended recording information zone 112 shown in FIG. 1, the reliability of the recording information zone 111 can be raised. In the case where the entry sector number cannot be read from the recording information zone 111 due to a reading error, the entry sector number can be read from the extended recording information zone 112.

The information recording zone 111 need not be provided in the lead-in area or the lead-out area. The information recording zone 111 may be provided in, for example, an area internal to the lead-in area. Alternatively, the information recording zone 111 may be provided in the volume structure area 101. In such cases, the effect of preventing concentration of data rewrite in a specific sector is provided. The reason is that the position of the trailing end of the area in which the entry sector number is recorded can be indicated while sequential loop recording is performed.

The number of count blocks is not limited to 10. The number of count blocks may be any number of 1 or greater. The number of registration blocks is not limited to 10. The number of count blocks may also be any number of 1 or greater.

The number of registration units is not limited to 250. The number of registration units may be any number of 1 or greater. When the number of registration units is 1, the count unit may be omitted, since it is not necessary to search for the valid registration unit. Namely, the recording information zone may be structured so as to include only one registration unit. When, for example, the number of registration blocks is sufficiently large, the recording information zone can be structured so as to include only one registration unit.

The recording unit in the recording information zone may be a sector, and is not limited to an ECC block.

The optical disc may have identification information pre-recorded thereon which indicates that the recording information zone is allocated to a predetermined area of the optical disc. This identification information guarantees the high reliability of the optical disc, to which the number of times of data rewrite is limited, at the time of shipment of the optical disc. The reason is that by sequentially recording data repeatedly using the recording information zone, the limitation on the number of times of data rewrite can be compensated for.

A write once type disc can be regarded as a disc to which the number of times of data rewrite is limited to zero. Use of the above-described recording information zone allows high-speed recognition of the valid registration unit and the valid registration block recorded therein even when the number of times of data rewrite is larger. When the number of times of data rewrite is still larger so that all the registration units in the recording information zone are used, further data rewrite becomes possible by allocating a part of the extended recording information zone as a recording information zone.

It is also possible to provide a recording information zone having a more appropriate data structure to a write once type disc by increasing the number of registration blocks in one registration unit or by increasing the number of count blocks in one count unit. For example, in the case where the number of count blocks in the count unit is equal to the number of registration units, the count block can be updated by the same number of times the registration unit is updated. In the case where the number of count blocks in the count unit is larger than the number of registration units, even when the count block cannot be updated due to a defect block or the like, the next count block can be used.

In order to avoid concentration of data rewrite in a specific count block in the count unit, data may be sequentially recorded repeatedly in the count unit. Namely, the count unit is an example of the third information recording area in which data is recordable by sequential loop recording. In this case, each count block included in the count unit includes a version number (version information) indicating the version of the count block and an identification number (identification information) of the registration unit, like the above-described registration block.

The latest count block is managed so as to have the largest version number in the count unit. The largest version number indicates the latest version information. The identification number (identification information) corresponding to the largest version number (latest version information) is used as the valid identification number (valid identification information) of the valid registration unit.

By sequentially recording data repeatedly to the count unit and each registration unit, old information remains in the count block and the registration blocks. Thus, pre-update information (files) can be maintained on the optical disc so that the information (files) can be used as backup information.

The above-described recording method is applicable to a write once type disc as well as a rewritable disc. Therefore, a common recording method can be useable for the rewritable disc and the write once type disc.

With the optical disc to which the number of times of data rewrite is limited, the registration blocks in the registration unit may be set to be usable until the registration block becomes unrecordable, instead of sequential loop recording being performed. This shortens the reading time of data from the registration unit. The registration block becomes unrecordable for reasons that, for example, data is rewritten by the number of times exceeding the rewritable number of times, and the registration block is placed into a defect state due to adherence of dust or the like. When the registration block becomes unrecordable, the next registration block is used. By using one count block repeatedly until the count block becomes unrecordable and also using one registration block repeatedly until the registration block becomes unrecordable, the reading time of data from the count unit can be shortened and the reading time of data from the registration unit can also be shortened.

1.7 File Reproduction Processing

Figure 7:
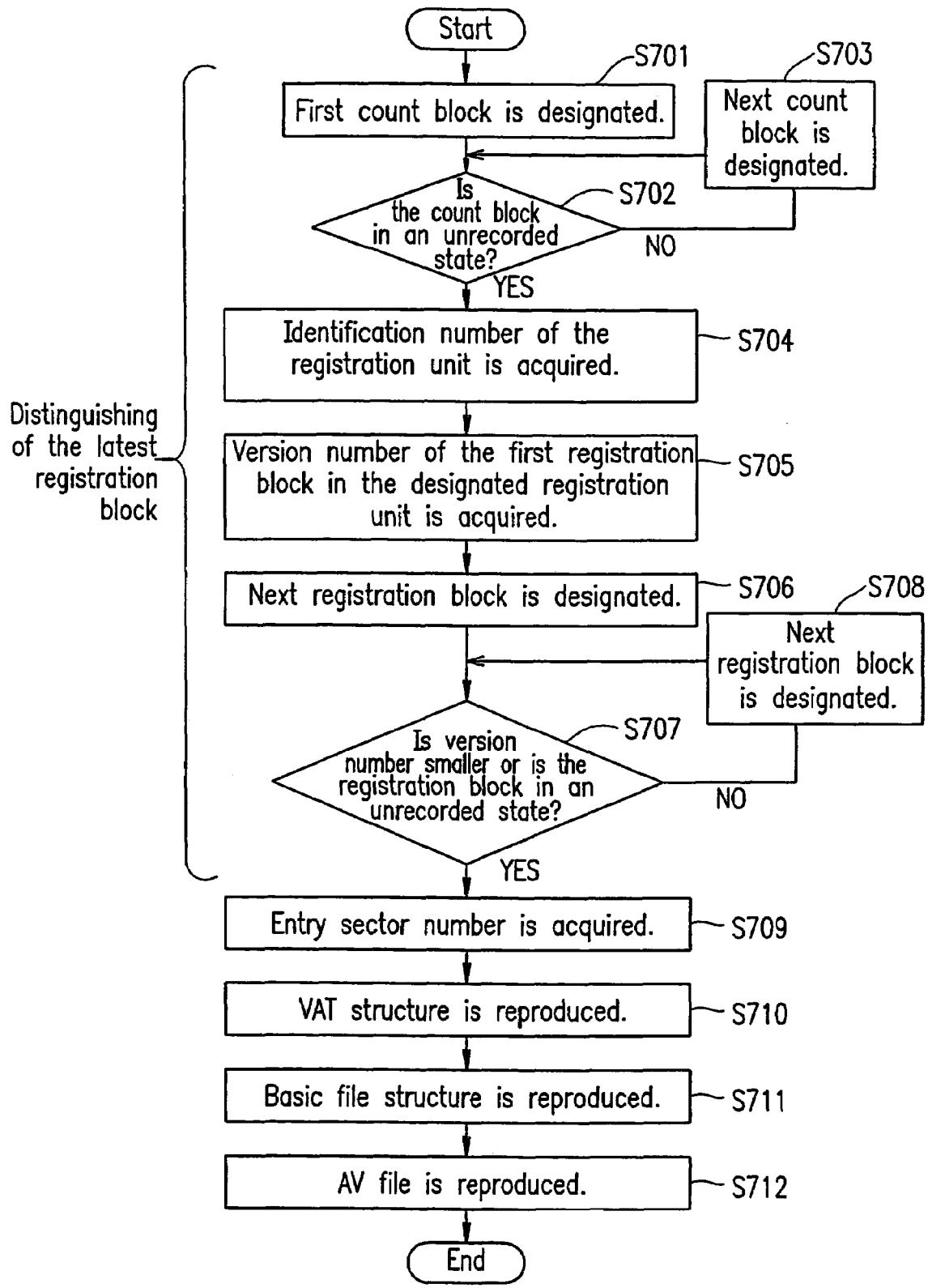
FIG. 7 is a flowchart illustrating a procedure of file reproduction processing in Example 1.

FIG. 7 shows a procedure of file reproduction processing for reproducing a file recorded on the optical disc 235. The file reproduction processing is performed by the information recording and reproduction apparatus shown in FIG. 2. Hereinafter, the steps shown in FIG. 7 will be described in detail. In the following example, an AV file (AVfile-d) 158 is reproduced from the optical disc 235 having the data structure shown in FIG. 1.

The optical disc 235 shown in FIG. 1 is obtained by deleting the AV file (AVfile-b) from the optical disc 235 having the data structure shown in FIG. 6 and recording an AV file (AVfile-c) and an AV file (AVfile-d).

(S701) When detecting that an optical disc is inserted to the optical disc drive device 205, the drive control section 231 designates the position of the first count block 171 in the count unit 141 in the recording information zone 111.

(S702) The drive control section 231 determines whether the designated count block in the count unit 141 is in an unrecorded state or not. When "yes", the processing advances to step (S704); and when "no", the processing advances to step (S703).

(S703) The drive control section 231 designates the position of the next count block in the count unit 141.

(S704) The drive control section 231 acquires an identification number (identification information) of a registration block from the last count block among the count blocks which are not in an unrecorded state.

(S705) The drive control section 231 executes a reproduction operation from the leading registration block in the registration unit designated by the identification number of the registration unit, thereby acquiring a version number (version information).

(S706) The drive control section 231 designates the position of the next registration block in the designated registration unit.

(S707) The drive control section 231 executes a reproduction operation from the designated registration block. When the designated registration block designated in this reproduction operation is in an unrecorded state, or when the version number recorded in the registration block is smaller than the version number acquired before, the processing advances to step (S709). Otherwise, the processing advances to step (S708).

(S708) The drive control section 231 designates a position of the next registration block in the designated registration unit. (S709) The drive control section 231 acquires an entry sector number recorded in the latest registration block, and stores the entry sector number in the recording information zone memory 273.

The operations of the drive control section 231 described in steps (S701) through (S709) are achieved by, for example, a control program built in the drive control section 231 as the information recording and reproduction means 272.

(S710) The system control section 201 acquires the entry sector number stored in the recording information zone memory 273 of the optical disc drive device 205 as information (pointer information) indicating the position of the trailing end of the latest file structure area. The system control section 201 instructs the optical disc drive device 205 to reproduce a VATICB 157 recorded at the trailing end of the latest file structure area. The above-described operations of the system control section 201 are achieved by, for example, executing a control program built in the system control section 201 as the VAT structure reproduction means 215. The optical disc drive device 205 reads the VATICB 157 recorded at the trailing end of the latest file structure area, and stores the VATICB 157 in the VAT structure memory 222 of the memory circuit 202.

Next, the system control section 201 decodes the positional information of the VAT included in the read VATICB, follows a similar control procedure to that for the VATICB so as to read a VAT 156 recorded in the VAT structure area 108, and stores the VAT 156 in the VAT structure memory 222 of the memory circuit 202.

(S711) The system control section 201 reads a file entry (root directory) 154 and a root directory 153 from a file set descriptor 152 while converting the virtual address into a logical address using the VAT acquired in step (S710). The system control section 201 also reads a file entry (AVDir) 151 and an AV directory (AVDir) 150 which are recorded in the same area as the file entry (root directory) 154 and the root directory 153, as well as a file entry (Datafile) 149 and a control file (Datafile) 148 sequentially. Thus, the recording position of the AV files and relevant information is acquired. The above-described operations of the system control section 201 are achieved by, for example, executing a control program built in the system control section 201 as the basic file structure reproduction means 261.

(S712) Finally, the system control section 201 executes a read operation of a file entry (AVfile-d) 159 and an AV file (AVfile-d) 158, thereby completing the file reproduction operation. The above-described operation of the system control section 201 is achieved by, for example, executing a control program built in the system control section 201 as the file reproduction means 216.

Figure 10:
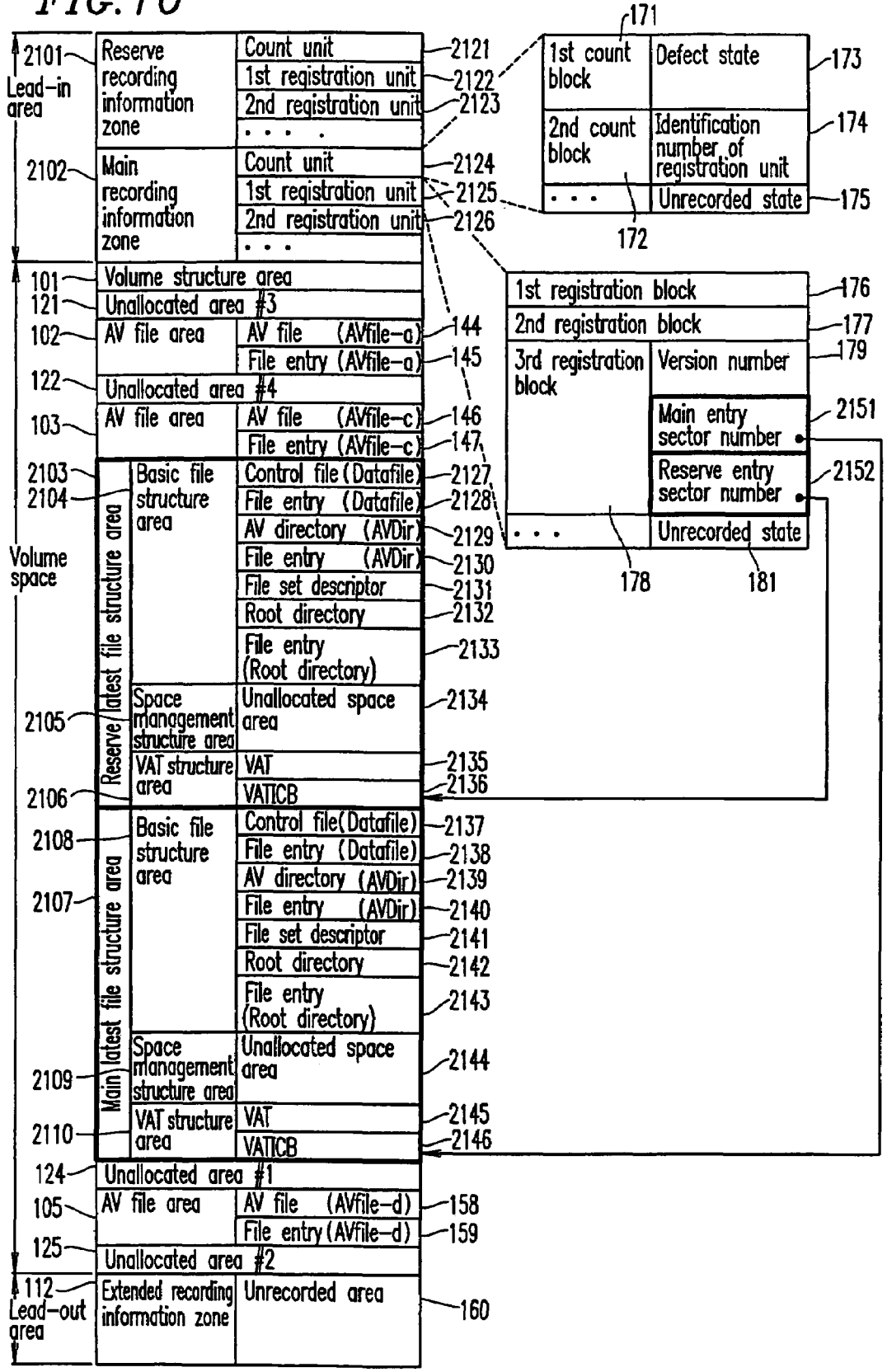
FIG. 10 shows a data structure of an information recording medium having a plurality of entry sector numbers in Example 1.

In order to avoid data from becoming unreadable due to a reading error during reproduction, a copy of the data may be recorded in another area. The latest file structure area which is moved by sequential recording may be doubled, and the positional information of the doubled latest file structure area may be designated in the recording information zone. For example, as shown in FIG. 10, a reserve latest file structure area 2103 and a main latest file structure area 2107 may be designated based on a main entry sector number 2151 and a reserve entry sector number 2152 recorded in the registration blocks recorded in the registration blocks recorded in a reserve recording information zone 2101 and a main recording information zone 2102.

There is a possibility that data reproduction becomes impossible due to the causing of scratches or dust after sequential recording with verify is performed. In order to allow the latest file to be read even in such a case, the main latest file structure area 2107 and the reserve latest file structure area 2103 may be provided in the volume space and the positional information thereof may be registered in the lead-in area as the main entry sector number 2151 and the reserve entry sector number 2152. Thus, data reproduction reliability is improved.

The information to be recorded in the reserve latest file structure area 2103 is basically reserve information of the information to be recorded in the main latest file structure area 2107. A VAT 2145 to be recorded in a VAT structure area 2110 is a correspondence table of the virtual addresses and the logical addresses of the latest file structure recorded in the main latest file structure area 2107. By contrast, a VAT 2135 to be recorded in a VAT structure area 2106 is a correspondence table of the virtual addresses and the logical addresses of the latest file structure recorded in the reserve latest file structure area 2103.

The positional information of the main latest file structure area 2107 and the positional information of the reserve latest file structure area 2103 may respectively be registered in the main recording information zone 2102 and the reserve recording information zone 2101 of the lead-in area as the main entry sector number 2151 and the reserve entry sector number 2152. In this case, the reserve recording information zone 2101 is an area where reserve information of the information registered in the main recording information zone 2102 is recorded. The structure and method of use of the main or reserve recording information zone are similar to those of the recording information zone shown in Example 1.

The positional information of the reserve latest file structure area may be designated with an offset address from the main entry sector number. The offset address may be designated to be, for example, the main entry sector number−256, the main entry sector number−512, the main entry sector number+256, or main entry sector number+512. The offset value may be registered in the information recording zone.

Even in the case where the recording information zone is provided in the volume space instead of the lead-in area, the effect of the present invention is clearly provided. The entry sector number may be recorded in, for example, the volume space such as the volume structure area 101. In this case also, substantially the same effect as provided when the entry sector number is recorded in the lead-in area is provided.

The recording position information indicating the next recording start position, such as the entry sector number, allows data to be recorded repeatedly in a certain direction such that the areas in which data is rewritten are distributed throughout the information recording area of the information recording medium.

Registration of the reserve information of the information recorded in the main recording information zone may be performed independently in the main recording information zone 2102 and the reserve recording information zone 2101. In this case, the count block or the registration block is recorded using recording with verify so as to avoid defect areas. Therefore, the number of the count block or the registration block which is the defect area is different between the main recording information zone 2102 and the reserve recording information zone 2101.

In the reserve recording information zone 2101, copy information may be recorded in the same count block or the same registration block as those in the main recording information zone 2102. In this case, it is not necessary to perform recording with verify in the reserve recording information zone 2101. Even in a defect state, recording is executed.

In this example, the information recorded in the reserve latest file structure area is copy information of the main latest file structure. For shortening the recording time, only the file structure updated from the previous time of recording may be recorded in the reserve latest file structure area. When data is unreadable from the main latest file structure area, the reserve latest file structure and the previous main latest file structure can be used to obtain the backup of the data. The previous main latest file structure can be acquired by distinguishing the previous registration block based on the version number and using the entry sector number recorded in the registration block.

As shown in FIG. 10, the latest file structure recorded in the volume space is doubled. In the case where the positional information of both of the doubled latest file structure is included in the lead-in area, the robustness of the file structure area which is indispensable to recording and reproduction of the file can be improved in the information recording medium, to which the number of times of data rewrite is limited, while performing sequential recording. By recording data, without fail, in the recording information zone which is an area designated for the positional information of the multiplied latest file structure area, reproduction reliability of the disc is improved, despite the risk of reproduction becoming impossible due to the causes of scratches or dust.

It is clear that the latest file structure area and the entry sector number are both applicable to doubling, tripling and other types of multiplication.

In the ECMA167 Standards, the file entry of the AV file is defined as a part of the file structure. In this example, the file entry of the AV file is recorded in the AV file area for simplicity of explanation.

In the case of an information recording medium on which no AV file is recorded, a control file may be recorded in the AV file area. Still, the effect of the present invention is clearly provided. In this case, the control file and the file structure thereof are sequentially recorded in the volume space.

In this example, a file structure using the VAT structure is recorded in the latest file structure area. In the latest file structure area designated by the entry sector number, a file structure of other file systems such as a FAT file system or the like may be recorded. Even when a file structure other than the VAT structure is used, the effect of avoiding concentration of data rewrite on a disc, to which the number of times of data rewrite is limited, is provided as far as the entry sector number recorded in the recording information zone is used.

In this example, when a disc is inserted, the system records a control file in the basic file structure area in order to recognize the information recorded in a plurality of AV files. In the case where only the file recorded on the disc need be recognized, it is not necessary to record the control and the file entry thereof in the basic file structure area. Then, the basic file structure area is smaller and thus the reading time is shortened. In the case where the basic file structure area is recorded within one ECC block as the minimum reading unit, the driving device performs data read only once. In this manner, an information recording medium according to the present invention causes the data to be updated or recorded including the latest file structure area to be moved from an inner portion to an outer portion. Therefore, data destruction or defect due to concentration of data rewrite is prevented and data reliability can be improved.

2. EXAMPLE 2

In Example 2, a method for sequentially recording an AV file in the AV file area pre-allocated in the volume space and a defect management method of information recorded in the latest file structure area will be described.

AV data to be recorded in the AV file area needs to be recorded continuously time-wise, and thus is recorded without verify. File management information, such as the file set descriptor, and a control file are required to be reliable and thus is recorded with verify so as to guarantee the data reliability at the time of recording. In general, an AV file has a large data size, whereas a control file or file management information have a small file size. AV data and non-AV data thus have different characteristics. An example in which an area used for recording AV data and an area used for non-AV data are separated will be described.

In the case where unallocated areas are managed in a table form as in Example 1, sequential recording is performed by defining the order in which management information in the unallocated areas is registered. In Example 2, unallocated areas are managed using an improved bit map which is recorded in the space management structure area, and sequential recording is performed in the AV file area in the volume space.

In the following description, a descriptor, a pointer and the like which are recorded on the information recording medium as a volume file structure have a data structure defined by the ECMA167 or UDF (Universal Disk Format) Standards unless otherwise described in detail.

2.1 Data Structure of the Optical Disc

Figure 11:
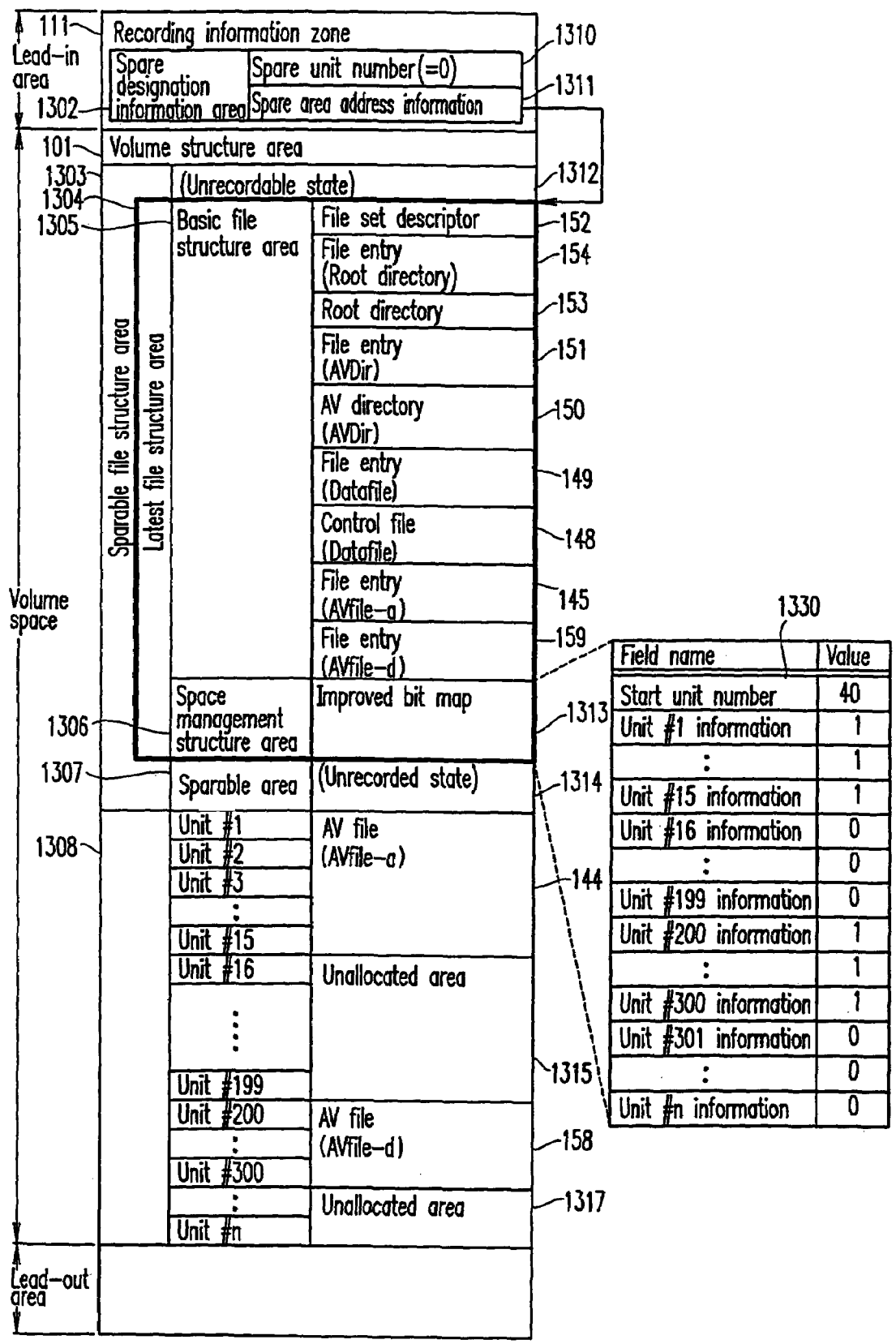
FIG. 11 shows a data structure of an information recording medium according to Example 2.

FIG. 11 shows an exemplary data structure of the optical disc 235.

The volume space has a volume structure area 101, a sparable file structure area 1303, and an AV file area 1308 pre-allocated at fixed positions thereof. The sparable file structure area 1303 includes a space management structure area 1306 in a part of the latest file structure area. In the space management structure area, an improved bit map is to be recorded.

A bit map is a map showing a recording state of each of areas of a certain unit, such as a sector or an ECC block. The recording state of each of areas of a certain unit is indicated by 0 in the case of an unrecorded state and by 1 in the case of a recorded state. A collection of bits showing the recording states of all the sectors is referred to as a bit map. In Example 2, a bit map shows a recording state of a unit. An advantage of performing management of unallocated areas with a bit map is that since the unallocated areas are designated using a bit for each of areas to be managed, the size of the bit map is fixed.

A "unit" is a unit for managing recording including one or more sectors. In this example, one unit includes about 5000 sectors.

The lead-in area has a recording information zone 111 allocated thereto. The recording information zone 111 includes a spare designation information area 1302 including a spare unit number 1310 and spare area address information 1311. In the spare designation information area, a latest file structure area 1304 is substituted for by a sparable area 1307 of the sparable file structure area 1303 or other units. Thus, when data rewrite is concentrated in the latest file structure area 1304 of the sparable file structure area 1303 or when the entire area becomes unrecordable, such substitution prevents the medium from becoming unrecordable entirely. As a result, data can be recorded in the latest file structure area.

2.2 File Recording Processing

Figure 13:
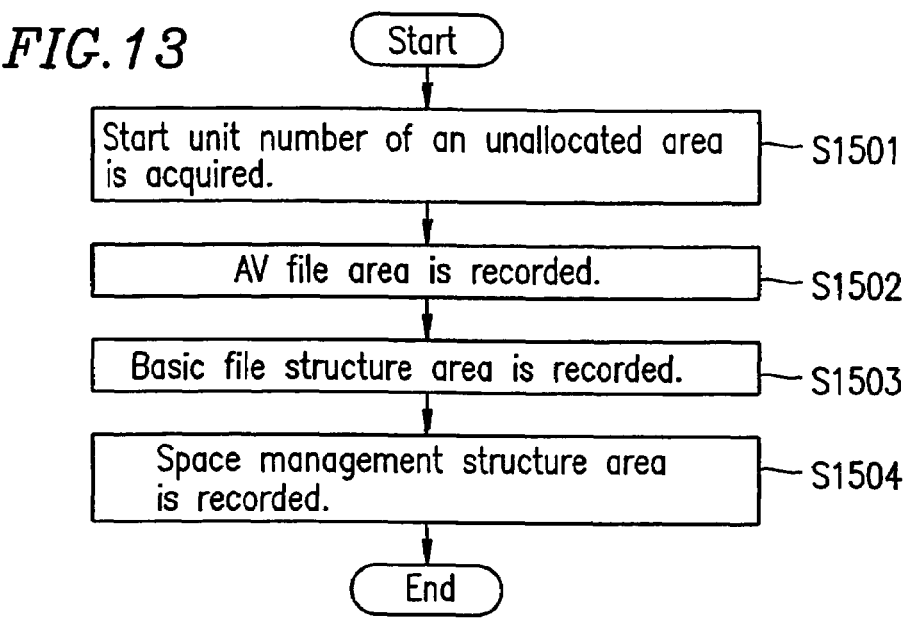
FIG. 13 is a flowchart illustrating a procedure of file recording processing in Example 2.

FIG. 13 shows a procedure of file recording processing for recording a file on the optical disc 235. The file recording processing is performed by the information recording and reproduction apparatus shown in FIG. 2. Hereinafter, the steps shown in FIG. 13 will be described in detail.

(S1501) The system control section 201 acquires a start unit number 1330 from the leading end of the improved bit map 1313 which has been read into the space management structure memory 253. The above-described operation of the system control section 201 is achieved by, for example, executing a control program built in the system control section 201 as the space management structure recording means 251.

(S1502) The system control section 201 instructs the optical disc drive device 205 to record the AV file (AVfile-d) 146 sequentially from unit #40 designated by the start unit number 1330. The above-described operation of the system control section 201 is achieved by, for example, executing a control program built in the system control section 201 as the file recording means 213.

(S1503) The system control section 201 updates the file structure including management information of the recorded AV file (AVfile-d), and instructs the optical disc drive device 205 to record the updated file structure in the latest file structure area 1304. The above-described operations of the system control section 201 are achieved by, for example, executing a control program built in the system control section 201 as the basic file structure recording means 261.

At this point, when a write error is returned from the optical disc drive device 205 for the reason that the latest file structure area 1304 of the sparable file structure area 1303 becomes unrecordable due to concentration of data rewrite, scratches or dust, the system control section 201 updates the basic file structure so as to change the recording position and issues an instruction that the recording should be performed in the sparable area 1307.

When another write error is returned from the optical disc drive device 205 for the reason that the sparable area 1307 becomes unrecordable due to concentration of data rewrite, scratches or dust, the system control section 201 issues an instruction that a basic file structure area should be recorded in which the recording position is changed to unit #56. In this manner, unit #56, which is the next recording start unit for performing recording sequentially in the AV file area 1308, can be used as a sparable file structure area. In this manner, when a write error occurs while data is being recorded in the latest file structure area, the data recorded in the latest file structure area is updated and recorded in an unrecorded sparable area. When there is no unrecorded area in the sparable area, the start unit number is used to allocate a sparable file structure area to an unallocated unit, and data recorded in the latest file structure area is updated and recorded at the leading end of the sparable file structure area. When the sparable file structure area is allocated to the unallocated unit, a predetermined size of sparable area is arranged in an unrecorded state. Therefore, even when a write error occurs while data is being recorded in the latest file structure area, spare recording is realized.

The drive control section 232 instructs the recording and reproduction means 234 to record the basic file structure in unit #56. When the recording is completed, "56" is recorded in a spare unit number 1410 in the recording information zone 111 in the lead-in area, and the address information of the latest file structure area is recorded in spare area address information 1411. Then, the drive control section 232 notifies the system control section 201 of completion of the processing.

(S1504) The system control section 201 creates an improved bit map 1412 reflecting the state of an unallocated area of the disc, and records the improved bit map 1412 in a space management structure area 1403. The above-described operations of the system control section 201 are achieved by, for example, executing a control program built in the system control section 201 as the space management structure recording means 251.

At this point, the unit number of 57 which indicates the first unallocated area after the recorded unit is registered as the start unit number at the leading end of the improved bit map. By this processing, the bits of units #40 through #56, which indicate the recording states of these units having data recorded therein, are changed to "1", which indicates "recorded".

Figure 12:
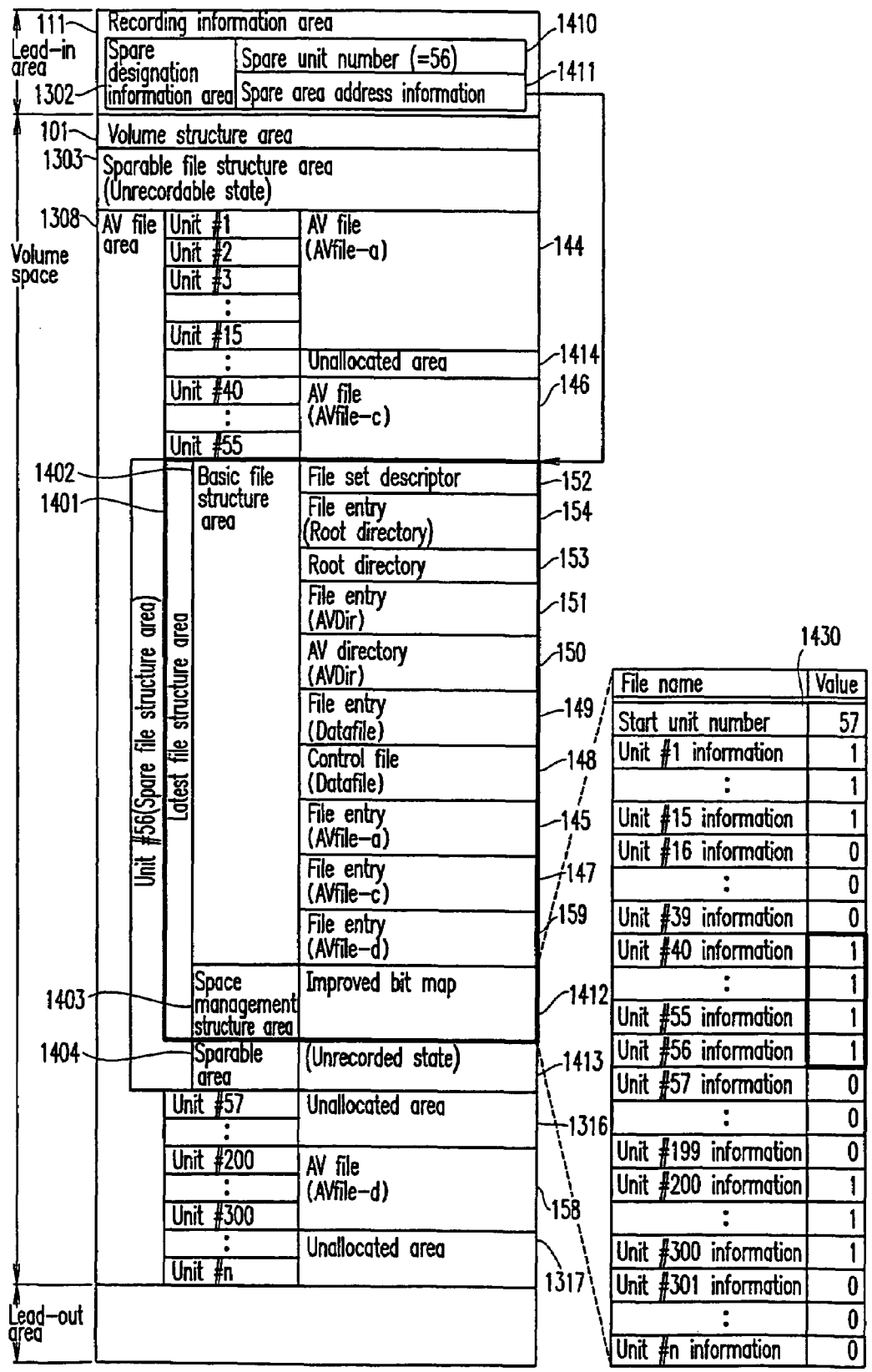
FIG. 12 shows a data structure of an information recording medium after substitution processing to a unit is performed in Example 2.

FIG. 12 shows a structure of data recorded on the optical disc 235 after the file recording processing is performed on the optical disc 235 having the data structure shown in FIG. 11.

In this example, the second cycle of the sequential recording performed in an inner portion to an outer portion in the AV file area is described. In an information recording medium to which the number of times of data rewrite is limited, the recording start position is designated by a start unit number. Therefore, sequential recording can be performed repeatedly in the AV file area, from an inner portion to an outer portion of the disc.

The next recording start position may be designated by an address instead of a start unit number. When the next recording start position is designated by an address, the recording start position can be designated in more detail as compared to the case of using a start unit number. Instead of the next recording start position, the previous recording end position may be designated.

In this example, the unallocated areas in which AV files can be recorded are designated unit by unit, and the areas in which the AV files are recorded are designated logical sector by logical sector. For simplification, the areas in which the AV files are recorded may also be designated unit by unit.

In this example, only the AV files are recorded in the AV file area. As described in Example 1, a file entry of the AV file may also be recorded in the AV file area.

In the case where the size of the control file is excessively large or the number of control files is excessively large, the control file(s) and file entry (entries) thereof may be recorded in the AV file area. In this manner, data rewrite is prevented from concentrating in a specific area when the control files are updated.

For recording data in the volume structure area and the latest file structure area, recording with verify is performed. For recording data in the AV file area, recording without verify is performed. "Recording with verify" refers to a recording method by which it is confirmed that data can be read after the recording is performed. "Recording without verify" refers to a recording method by which it is not confirmed that data can be read after the recording is performed.

In this example, the latest file structure area after substitution is managed by the system control section 201. In a system in which the spare area is managed by the drive control section 231, the management may be performed by a system referred to as "linear replacement". "Linear replacement" refers to a system by which the drive control section manages the correspondence between logical address information designated by the system control section and physical address information of the address at which data is actually recorded. By this system, reproduction is performed not by accessing the indicated logical address but by reading data from the corresponding physical address. In this system, the system control section need not update the recording position information for the basic file structure in accordance with the substitution.

In the case where two-stage substitution processing is performed including substitution by a sparable area and allocation of a sparable file structure area to a unit, even when the number of data rewrite unexpectedly increases in a medium having a defined size of file structure area or AV file area, recording to and reproduction from the medium can be performed without interruption.

2.3 File Reproduction Processing

Figure 14:
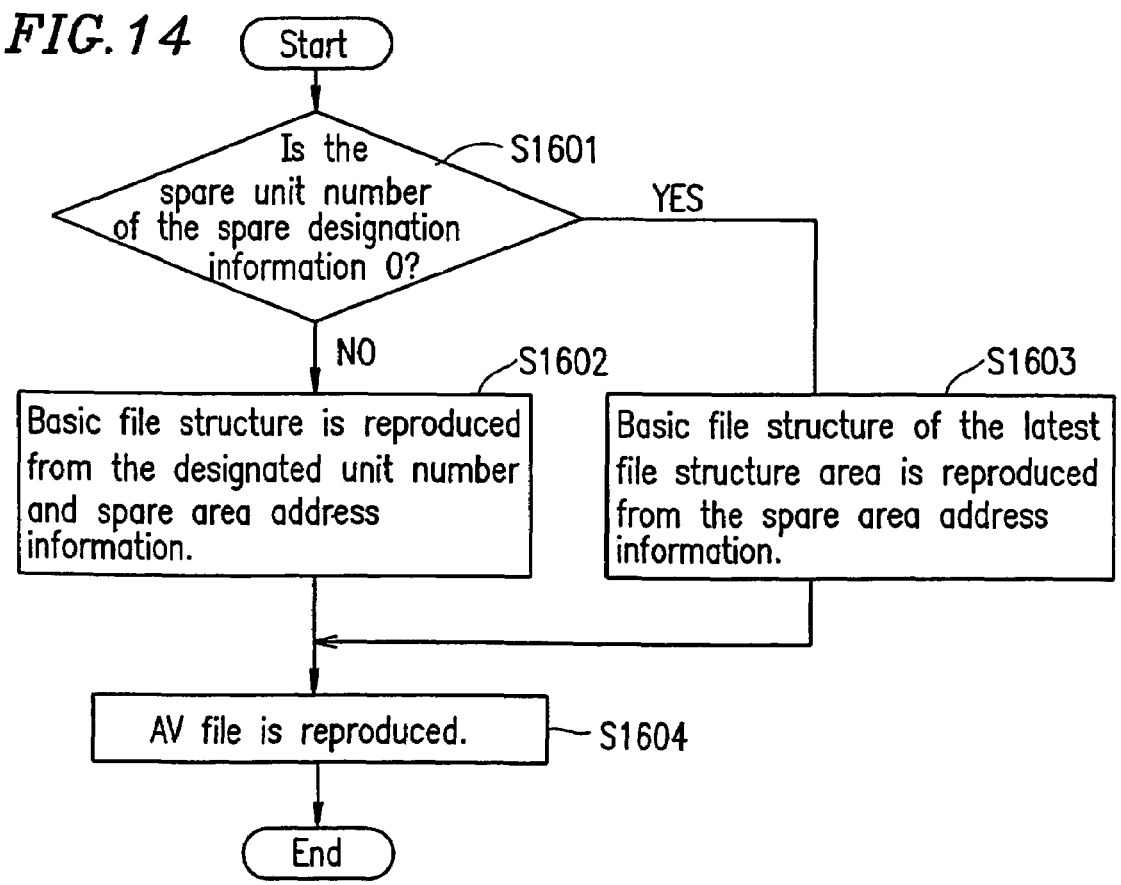
FIG. 14 is a flowchart illustrating a procedure of file reproduction processing in Example 2.

FIG. 14 shows a procedure of file reproduction processing for reproducing a file recorded on the optical disc 235. The file reproduction processing is performed by the information recording and reproduction apparatus shown in FIG. 2. Hereinafter, the steps shown in FIG. 14 will be described in detail. In the following example, the AV file (AVfile-d) 158 is reproduced from the optical disc 235 having the data structure shown in FIG. 12.

(S1601) When an optical disc is inserted to the optical disc drive device 205, the drive control section 231 reads a spare unit number 1410 and spare area address information 1411 from the spare designation information area 1302 of the recording information zone, and notifies the system control section 201 of the spare unit number 1410 and the spare area address information 1411. The above-described operations of the system control section 201 are achieved by, for example, executing a control program built in the system control section 201 as the information recording and reproduction means 272.

The system control section 201 determines whether the read spare unit number 1410 is 0 or 1. When the number is 0, the processing advances to step (S1603). Otherwise, the processing advances to step (S1602).

(S1602) The system control section 201 reproduces a basic file structure from a basic file structure area of the latest file structure area recorded in a unit having the designated unit number, based on the spare unit number and the spare area address information.

In the example shown in FIG. 12, the spare unit number 1410 is 56. Accordingly, a basic file structure is read from a basic file structure area 1402 of a latest file structure area 1401 recorded in unit #56.

(S1603) The system control section 201 reproduces a basic file structure from a basic file structure area of the latest file structure area recorded in a pre-allocated sparable file structure area, based on the spare address information.

In the example shown in FIG. 11, the spare unit number 1410 is 0. Accordingly, a basic file structure is read from a basic file structure area 1305 of the latest file structure area 1304 recorded in the sparable file structure area 1303.

The operations of the system control section 201 described in steps (S1602) and (S1603) are achieved by, for example, executing a control program built in the system control section 201 as basic file structure reproduction means 262.

(S1604) The system control section 201 decodes the basis file structure and reproduces the intended AV file (AVfile-d) 158. The above-described operations of the system control section 201 are achieved by, for example, executing a control program built in the system control section 201 as file reproduction means 216.

In general, the size of AV files is larger than the size of control data. Therefore, in this example, the AV files are managed unit by unit. Accordingly, the recording position information of an AV file can be easily designated using a unit number instead of a logical sector number.

In this example, unallocated areas are registered in the bit map in the order from an inner portion to an outer portion of the disc. Accordingly, sequential loop recording can be performed by designating the next recording position with a start unit number. By the method of managing unallocated areas using a table as shown in Example 1, unallocated areas are registered in the table in the order from an inner portion to an outer portion of the disc, and the next recording start position is designated by an entry sector number.

In Example 2, the sparable file structure area is pre-allocated in the volume space. Therefore, data rewrite of the latest file structure is concentrated. However, the spare designation information area including the recording information zone allows data to be recorded at a different location. As a result, the medium is prevented from becoming entirely unusable.

By use of a start unit number provided in the improved bit map which is recorded in the space management structure area, a recording start position in the AV file area can be acquired. This allows the AV files to be recorded sequentially while avoiding concentration of data rewrite. In the case where the start unit number is registered at the leading end of the space management structure, recording can be started from the recording start position immediately after the space management structure is acquired.

In Example 1, data is sequentially recorded in the latest file structure area. In Example 2, data is rewritten in the latest file structure area each time the data is updated. Recording of the latest file structure area may be performed sequentially and repeatedly in the sparable file structure area, using, as described in Example 1, empty area information recorded in the space management structure area and spare address information which indicates the position allocated as the latest file structure area. For example, recording may be performed in the following manner for updating data. Up to the trailing end of the sparable file structure area, an unallocated area is searched for in a certain direction (for example, from an inner portion to an outer portion of the disc) from a position continuous from the position of the area to which the latest file structure area is allocated (i.e., the position indicated by the pointer information). The area is allocated based on the search result, and data of the latest file structure area is recorded in the allocated area. In the case where the latest file structure area is recorded at the trailing end of the sparable file structure area, an unallocated area is searched for in a certain direction from the leading end of the sparable file structure area. The area is allocated based on the search result, and data of the latest file structure area is recorded in the allocated area.

As can be understood, the sparable file structure area is structured such that another area (for example, the latest file structure area) can be allocated to a part of the sparable file structure area. The different area (for example, the latest file structure area) allocated to the part of the sparable file structure area is structured so as to be movable in the sparable file structure area. Thus, data can be recorded repeatedly in a certain direction such that latest file structure areas are distributed throughout the sparable file structure area.

In Example 2, sequential loop recording can be performed both in the AV file area and the sparable file structure area. Thus, concentration of data rewrite in any specific area throughout the disc is avoided. By dividing an area into a plurality of areas and performing sequential loop recording in each of the divided areas, data reliability can be improved and the reading speed of an intended file can be raised.

3. EXAMPLE 3

In Example 3, AV files are sequentially recorded in the AV file area, using a table for simultaneously managing the recording position of a file and the position of an unallocated area, such as a FAT file system applied to a hard disc or the like.

When constructing a system compatible with a hard disc, the hard disc and the optical disc can be handled by one file system by introducing the FAT file system to the optical disc.

In the following description, a descriptor, a pointer and the like which are recorded on the information recording medium as a volume file structure have a data structure defined by the ECMA167 or UDF (Universal Disk Format) Standards unless otherwise described in detail.

3.1 Data Structure of the Optical Disc

Figure 15:
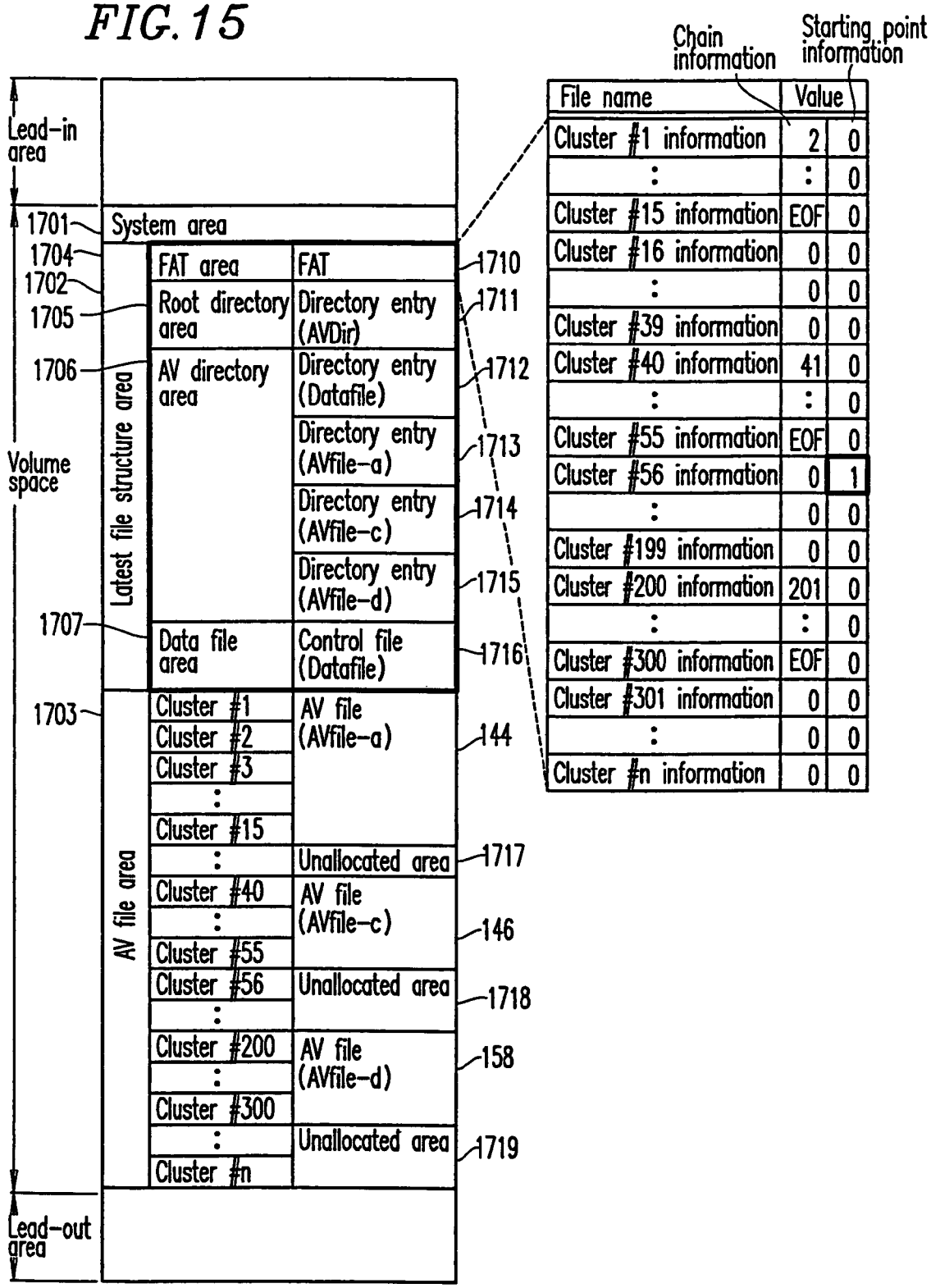
FIG. 15 shows a data structure of an information recording medium according to Example 3.

FIG. 15 shows an exemplary data structure of the optical disc 235.

The volume space has a system area 1701, a latest file structure area 1702, and an AV file structure area 1703.

The latest file structure area 1702 includes a FAT (File Allocation Table) area 1704, a root directory area 1705, an AV directory area 1706, and a data file area 1707. In the FAT area 1704, FAT is recorded, which has chain information on the recording positions of directories and files and information on the recording state of clusters.

The FAT is a table in which cluster recording information having recording information for each of clusters is recorded. The number of pieces of cluster recording information recorded corresponds to the number of clusters. In a directory entry recorded in the root directory area 1705 and an AV directory area 1706, start cluster numbers of the directory and the file are registered. In the example shown in FIG. 15, a directory entry (AVfile-a) 1713 has start cluster number 1 of an AV file (AVfile-a) 144. The FAT chain information includes cluster #1 as a start cluster of the AV file (AVfile-a) and cluster number 2, which is the number of the next cluster, registered thereto. In this manner, the AV file (AVfile-a) is reproduceable by following the chain information. In the "value" section of the chain information, "EOF" indicates the trailing end of the file and is, for example, FF8 (hexadecimal).

A cluster is a unit for recording management including one or more sectors. In this example, one cluster includes about 5000 sectors.

3.2 File Recording Processing

Figure 16:
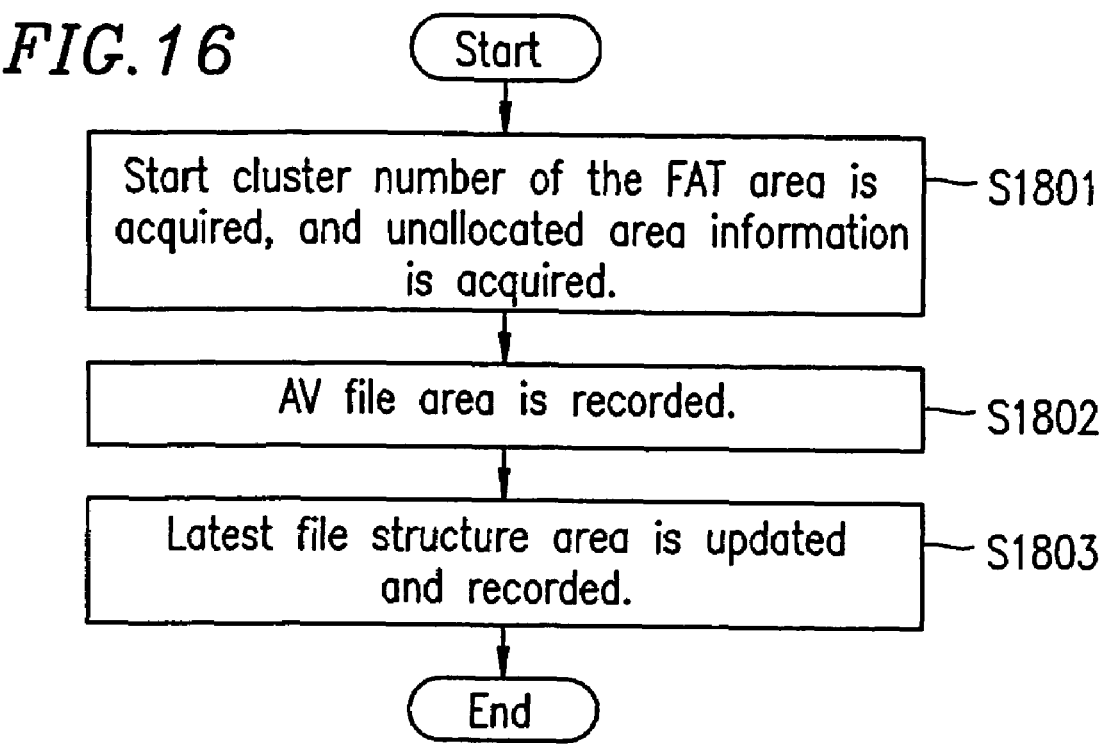
FIG. 16 is a flowchart illustrating a procedure of file recording processing in Example 3.

FIG. 16 shows a procedure of file recording processing for recording a file on the optical disc 235. The file recording processing is performed by the information recording and reproduction apparatus shown in FIG. 2. Hereinafter, the steps shown in FIG. 16 will be described in detail.

(S1801) The system control section 201 reads a FAT from the FAT area 1704 at the leading end of the latest file structure area 1702, searches for a cluster number marked as starting point information, and sequentially acquires information on unallocated areas from the marked cluster number in an ascending order. The above-described operations of the system control section 201 are achieved by, for example, executing a control program built in the system control section 201 as the space management structure recording means 251.

(S1802) The system control section 201 sequentially records AV files from the designated starting point cluster. The above-described operation of the system control section 201 is achieved by, for example, executing a control program built in the system control section 201 as the file recording means 213.

(S1803) The system control section 201 records, in the latest file structure area, the AV directory area including the information on the recorded AV file, the root directory area, the data files, and the FAT area. In the FAT recorded at this point, the cluster information, having the chain information and the starting point information of the recorded files, is updated. For example, in FIG. 15 showing the data structure after the AV file (AVfile-c) 146 is recorded, the next recording starting point is cluster #56. Therefore, "1" is registered as the starting point information of the cluster #56 of the FAT 1710. The above-described operations of the system control section 201 are achieved by, for example, executing a control program built in the system control section 201 as the basic file structure recording means 261.

In this example, the second cycle of the sequential recording performed in an inner portion to an outer portion in the AV file area is described. In an information recording medium to which the number of times of data rewrite is limited, sequential loop recording is performed in a similar manner in the AV file area in the first and subsequent cycles.

For simplicity of explanation, the control file, which is a data file, is recorded as a part of the latest file structure area. The control file is not supplied with any cluster number and is managed by the logical sector number. Alternatively, a data file may be recorded in the cluster in the AV file area as a data file for controlling the information of an AV file.

In Example 3, the AV directory area, the root directory area, the data files, and the FAT area are recorded in the latest file structure area in accordance with the basic file structure recording means 261. The FAT has a structure having a function of a space management structure, but also performs file management. Therefore, the FAT is handled by the basic file structure recording means and the basic file structure reproduction means.

In Example 3, the starting point information for performing sequential recording is recorded with bit 1. It is clear that the starting point information may be indicated with other values such as FFh.

In Example 3, the start position of sequential recording can be acquired also using a data structure, such as a FAT, in which the information on unallocated areas and the chain information of files are managed by the same table. In this case also, AV files can be sequentially recorded while avoiding concentration of data rewrite in the AV file area.

In Example 2, the start unit number is registered at the leading end of the space management structure. In Example 3, the starting point information is registered as a part of the information on each cluster in the space management structure. In the case where the starting point information is registered in reserved bytes of information on each cluster, this file system can be compatible with existing computer operating systems without extending the FAT Standards.

The two-stage defect management method described in Example 2 is applicable to the latest file structure area including the FAT area in this example.

The cluster, which becomes unusable due to occurrence of a defect in the AV file area, may be registered in the FAT 1710 in the FAT area 1704. In this case, FFh is registered as, for example, the value of the starting point information.

4. EXAMPLE 4

In Example 4, an exemplary defect management method when an AV file, a control file, and a volume file structure are sequentially recorded on a disc to which the number of times of data rewrite is limited will be described.

Even in the case where, as in Example 1, occurrence of a defect area is prevented by avoiding concentration of data rewrite in a specific area using sequential recording, the number of defect areas increases as the disc is used an increasing number of times.

In the following description, a defect area includes an area in which data cannot be recorded or reproduced, and a minimum unit thereof is 1 ECC block.

4.1 Data Structure of the Optical Disc

Figure 17:
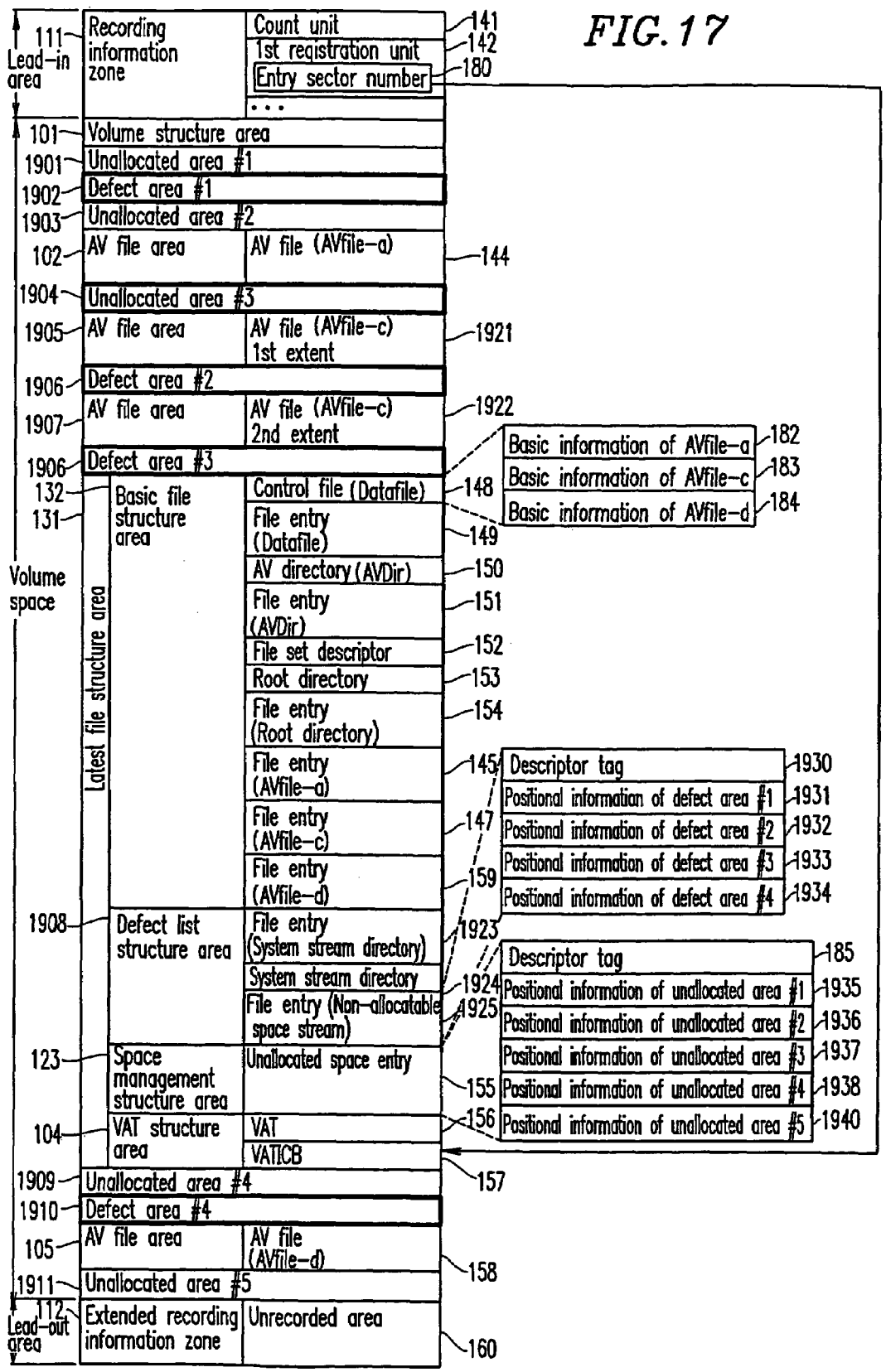
FIG. 17 shows a data structure of an information recording medium according to Example 4.

FIG. 17 shows an exemplary data structure of the optical disc 235.

The volume space includes defect areas 1902, 1906, 1906 and 1910. A defect list structure area 1908 is allocated in which these defect areas are to be registered. In the defect list structure area 1908, a system stream directory 1923 in which a data structure for the system is to be registered, a file entry 1924 thereof, and a file entry 1925 of a non-allocatable space stream are recorded. The non-allocatable space stream is a data structure defined for registering a defect area or an area in which a volume file structure cannot be allocated. In this example, the non-allocatable space stream is used for registering the positional information of a defect area.

Figure 18:
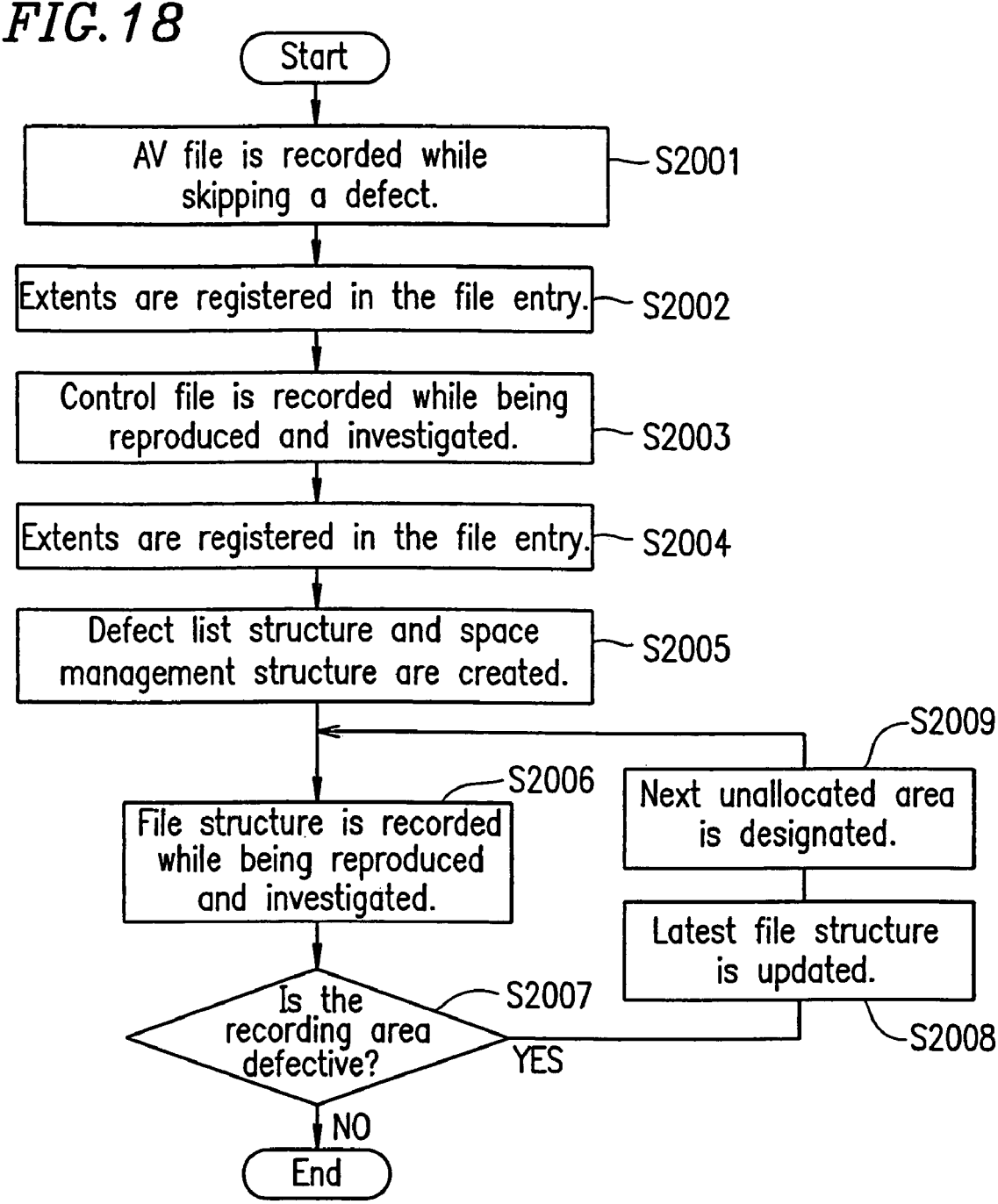
FIG. 18 is a flowchart illustrating a procedure of file recording processing in Example 4.

FIG. 18 shows a procedure of file recording processing for recording a file on the optical disc 235. The file recording processing is performed by the information recording and reproduction apparatus shown in FIG. 2. Hereinafter, the steps shown in FIG. 18 will be described in detail. In the following example, the AV file (AVfile-c) is recorded on the optical disc 235 having the data structure shown in FIG. 17.

(S2001) The system control section 201 records the AV file (AVfile-c) in unallocated areas sequentially from the unallocated area having the designated entry sector number.

When the defect area 1906 is detected while recording the AV file, the system control section 201 skips the defect area and continues the recording in the next unallocated area. Accordingly, the areas in which the AV file is actually recorded are a first extent 1921 of an AV file area 1905 and a second extent 1922 of an AV file area 1907. The above-described operation of the system control section 201 is achieved by, for example, executing a control program built in the system control section 201 as the file recording means 213.

(S2002) The system control section 201 creates a file entry (AVfile-c) 147 having positional information of the first extent 1921 and the second extent 1922 (in which the AV file (AVfile-c) is recorded) registered therein. The system control section 201 then stores the file entry (AVfile-c) 147 in the basic file structure memory 235 of the memory circuit 263.

(S2003) The system control section 201 records a control file (Datafile) 148 on a subsequent unallocated area. When a defect area is detected while recording the control file, the system control section 201 skips the defect area and continues the recording in the next unallocated area, like in the case of the recording of the AV file described in step (S2001).

(S2004) The system control section 201 creates the file entry (Datafile) 149 in which the positional information of the area (extent), in which the control file (Datafile) 148 is recorded, is registered. The system control section 201 then stores the file entry (Datafile) 149 in the basic file structure memory 235 of the memory circuit 263. In the case where the control file is recorded in a plurality of extents due to a defect area being detected, all the extent position information is registered when the recording position information of the control file is registered, like in the case of the AV file.

(S2005) The system control section 201 creates a system stream directory 1924, which is a defect list structure, and the file entry 1923 thereof, and also creates the file entry 1925 of an allocated space stream in which the positional information of a defect area detected in the volume space is registered. The system control section 201 stores the file entry 1925 in the basic file structure memory 235.

In addition, the system control section 201 creates the unallocated space entry 1925 in which positional information of the unallocated space is registered, excluding the unallocated areas recorded in the file recording processing and positional information of the defect areas detected in the file recording processing. The system control section 201 then stores the unallocated space entry 1925 thereof in the basic file structure memory 235.

Concurrently, the system control section 201 creates the AV directory (AVDir) 150 including information of the recorded AV file and the control file, the file set descriptor 152, the root directory 153, the file entry 154 of the root directory, the file entries 145 and 159 in which positional information and attribute information of recorded AV files (AVfile-a) 144 and (AVfile-d) 158 are registered, the VAT 156, and the VATICB 157. The system control section 201 stores these data in the basic file structure memory 235.

(S2006) The system control section 201 records the basic file structure, the defect list structure, the space management structure 123 and the VAT structure, which are created in steps (S2002), (S2004) and (S2005), in the latest file structure area 131.

(S2007) In the case where a defect area is detected while data is being recorded in the latest file structure area 131, the processing of steps (S2008) et seq. is executed. When the recording is completed with no defect being detected, the file recording processing is terminated.

(S2008) The system control section 201 updates the defect list structure and the registration information on the space management structure. In the non-allocatable space stream which is a defect list structure, positional information on a newly detected defect area is registered. From the non-allocatable space stream which is a space management structure, the positional information on a newly detected defect area is eliminated.

(S2009) The system control section 201 designates the subsequent unallocated area in order to record data in the updated latest file structure.

The operations of the system control section 201 described in steps (S2001) through (S2009) are achieved by, for example, executing a control program built in the system control section 201 as the basic file structure recording means 261.

In the recording processing of the AV file in this example, an area, from which an error report is returned for the reason that the recording cannot be completed while recording is performed without verify, is identified as a defect area.

In general, data to be recorded in the volume structure area and the latest file structure area is recorded with verify, and data to be recorded in the AV file area is recorded without verify. Alternatively, the data to be recorded in the AV file area may be recorded with verify. The data to be recorded in the volume structure area and the latest file structure area may be recorded without verify. The data to be recorded in the AV file area may be recorded with recognition that there is no defect area, in order to save the time required for substitution processing. In this case, a defect area is distinguished at the time of reproduction of the file.

In order to change the defect management method in accordance with the characteristics of the file, an area used for recording data to which one defect management method is applied, and an area used for recording data to which a different defect management method is applied, may be separated from each other.

An area from which the file cannot be reproduced may also be registered as a defect area.

The positional information of a defect area registered as a non-allocatable space stream is used for re-formatting the medium. Accordingly, it is necessary to maintain the content of the non-allocatable space stream until the medium is re-formatted.

The positional information of the detected defect area may be recorded outside the volume space. For example, such positional information may be managed in the registration block of the recording information zone in Example 1.

The method described in this example may be applied to Example 3. When performing defect management, data is recorded while a defect area being skipped, and defect information is registered in the FAT.

As described above, in this example, while sequential recording on a rewritable medium is repeated, recording in the subsequent area can be performed while avoiding a detected defect area without substitution. Thus, in the case of a rewritable recording medium in which the amount of detected defects significantly changes in accordance with the conditions of use, it is not necessary to obtain a spare area in advance or to extend the spare area when there is a shortage thereof. The area of the medium can be effectively used.

5. EXAMPLE 5

In Example 5, regarding a disc to which the number of time of data rewrite is limited as a result of the density being increased, an exemplary data structure for an entry sector number used for performing sequential loop recording from an inner portion to an outer portion of the disc, and an exemplary update method thereof, will be described.

In this example, an entry sector number is recorded in the volume space which is managed by the file system, not in the recording information zone.

In Example 1, the recording information zone includes a count unit and a plurality of registration units, so that the reliability of the entry sector number of the disc to which the number of times of data rewrite is limited is improved.

In this example, the reliability of the entry sector number can be improved since the data structure defined by the ECMA167 is updated stepwise, and the recording information zone is not necessary since the entry sector number is recorded. Thus, the techniques described in this example is applicable to general-purpose discs.

Figure 19:
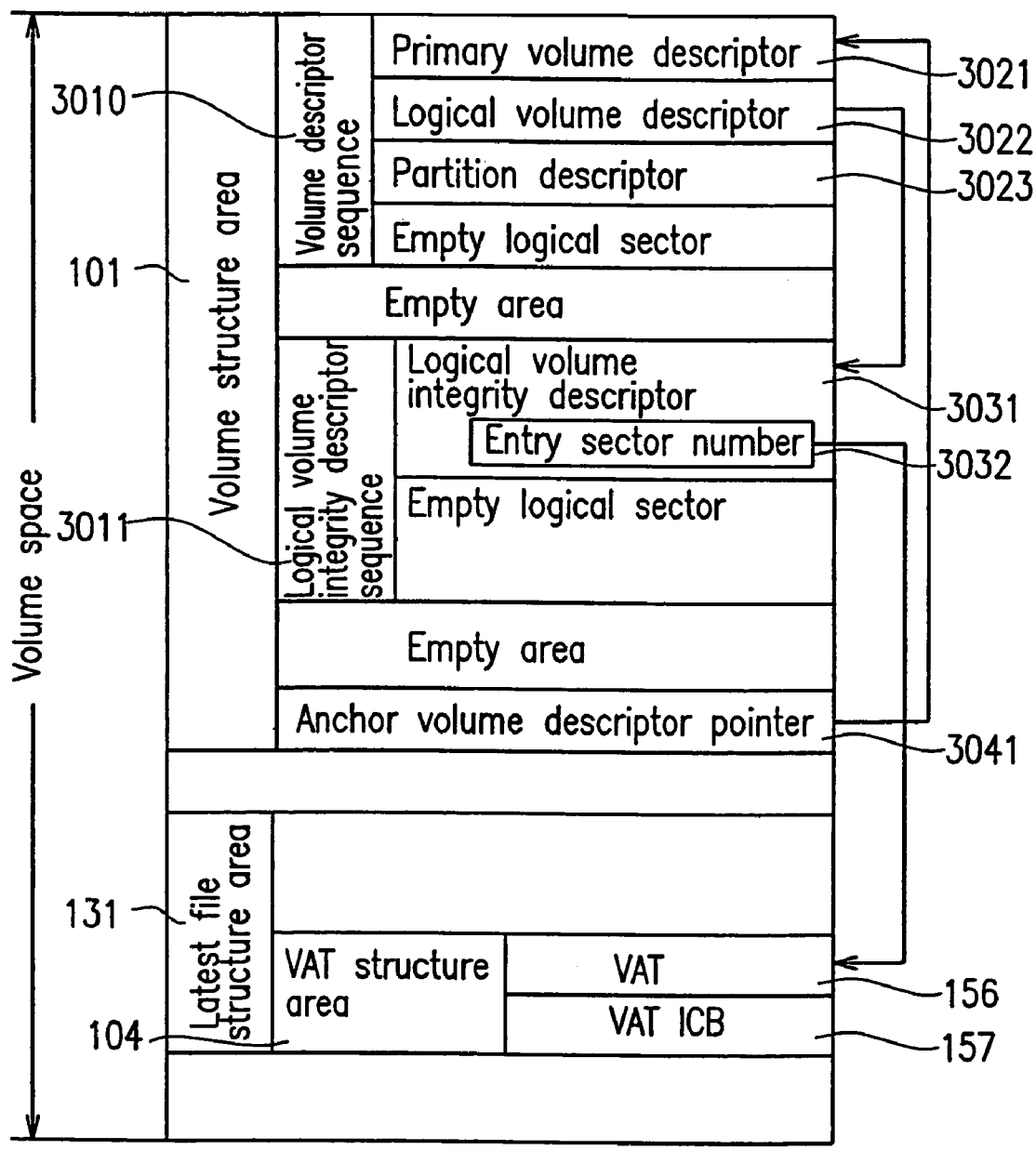
FIG. 19 shows a data structure of an information recording medium according to Example 5.

FIG. 19 is a data structure regarding an entry sector number which is updated and recorded in the volume structure.

A function of an entry sector number 3032 is the same as the function described in the other examples. In FIG. 19, the entry sector number 3032 indicates the address of the VAT ICB 157 of the VAT structure area 104 in the latest file structure area 131. The entry sector number 3032 is recorded in a field saved for the processing system in a logical volume integrity descriptor 3031 in a logical volume integrity descriptor sequence 3011.

Recorded in the logical volume integrity descriptor is integrity information indicating whether or not the file structure recorded in the volume space is in a correct state. Therefore, the reliability of the entry sector number can be further improved by recording the entry sector number in the logical volume integrity descriptor.

Positional information of the logical volume integrity descriptor sequence 3011 is recorded in a logical volume descriptor 3022 in a volume descriptor sequence 3010. The volume descriptor sequence 3010 is provided for recording a descriptor regarding a volume. A primary volume descriptor 3021 and a partition descriptor 3023 are recorded in the volume descriptor.

Positional information of the volume descriptor sequence 3010 is recorded in an anchor volume descriptor pointer 3041. The anchor volume descriptor pointer is recorded in a fixed sector at a logical sector number 256. Although not shown, the anchor volume descriptor pointer is also recorded in the logical sector of N-256, where N is the logical sector number of the outermost portion of the volume space. Since the anchor volume descriptor pointer is recorded twice, even when one of the pointers cannot be read, the other anchor volume descriptor pointer can be used.

Figure 20:
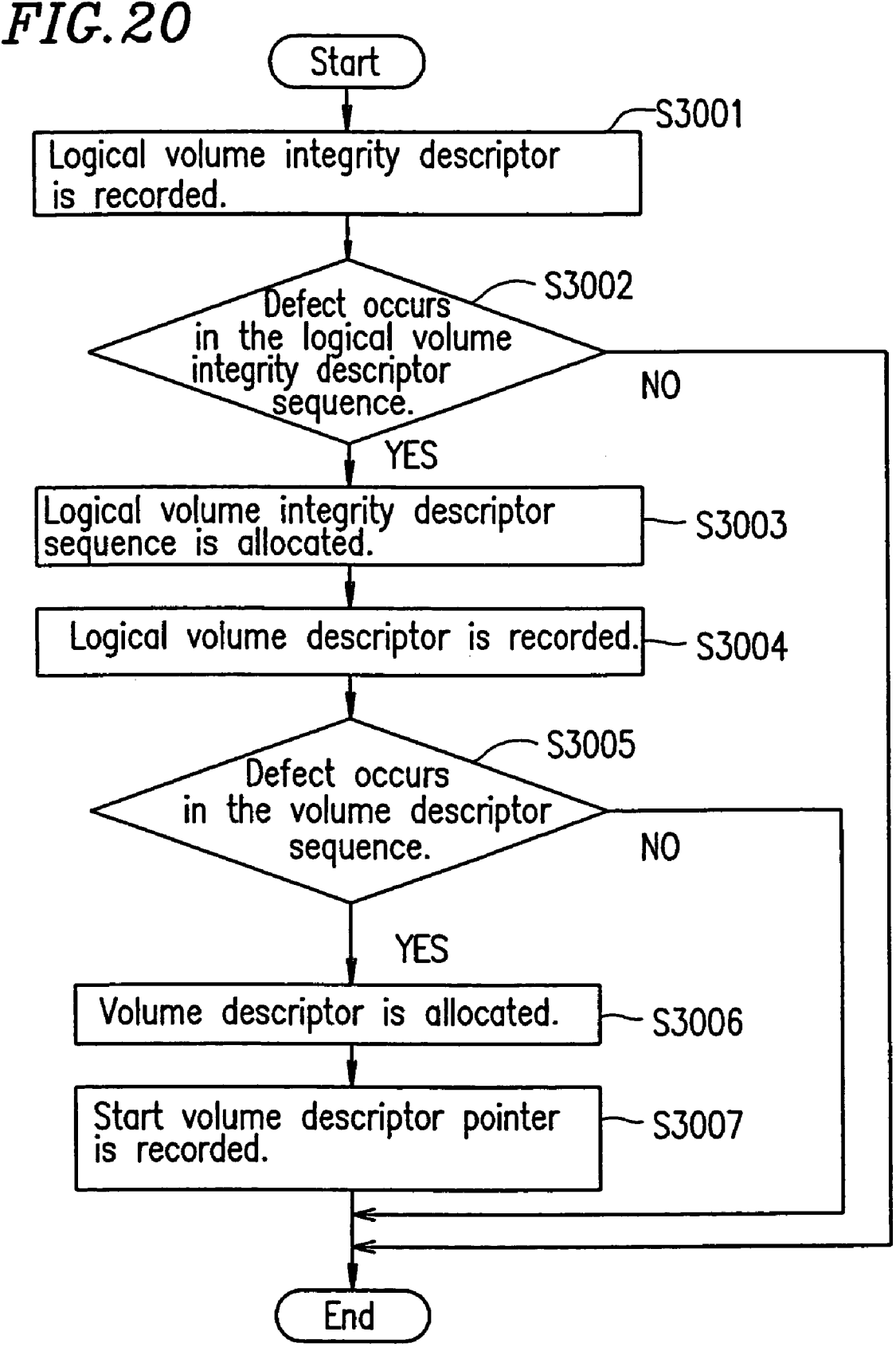
FIG. 20 is a flowchart illustrating a procedure of update processing of an entry sector number in Example 5.
Figure 21:
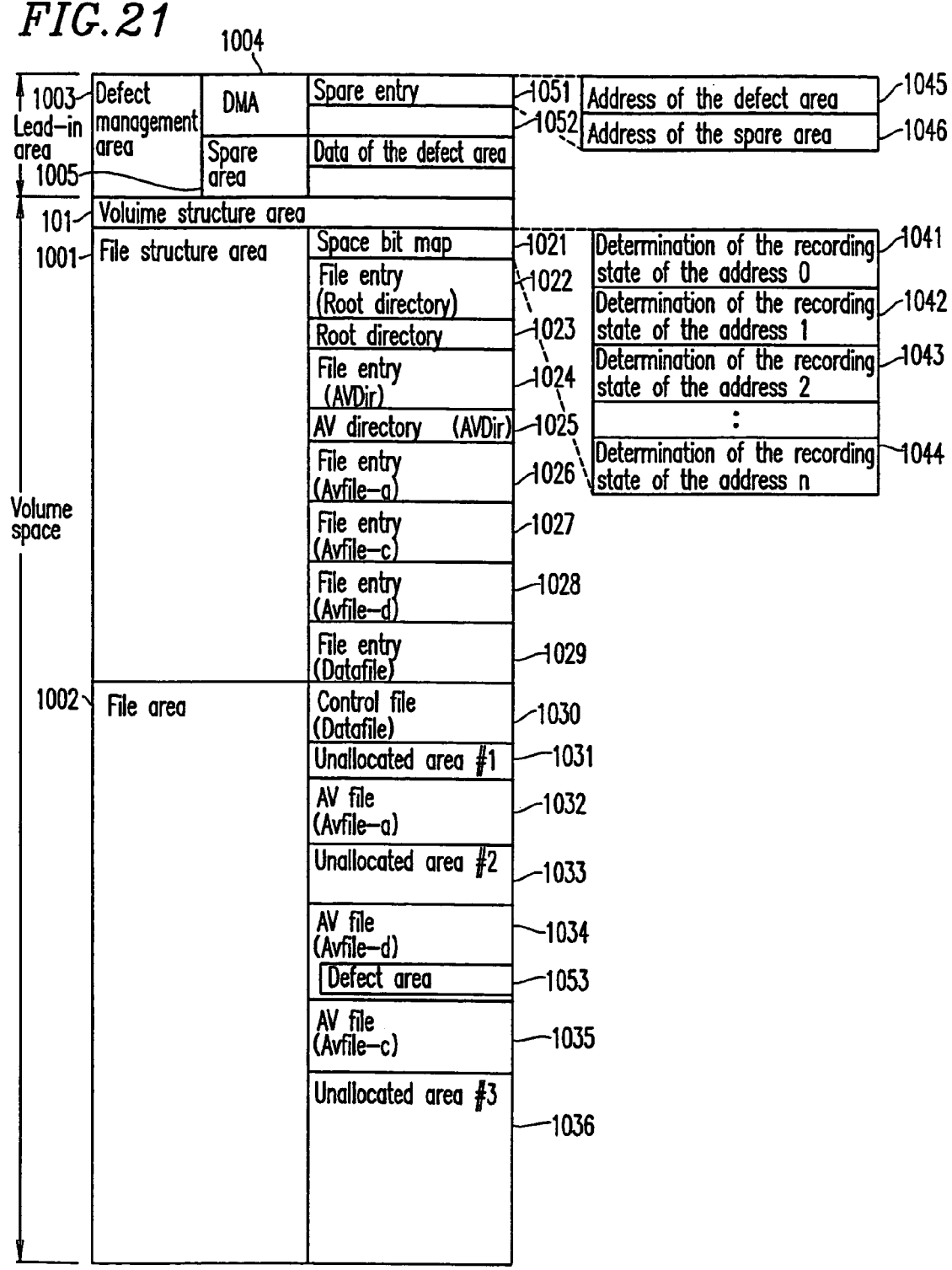
FIG. 21 shows a data structure of a conventional DVD-RAM disc.
Figure 22:
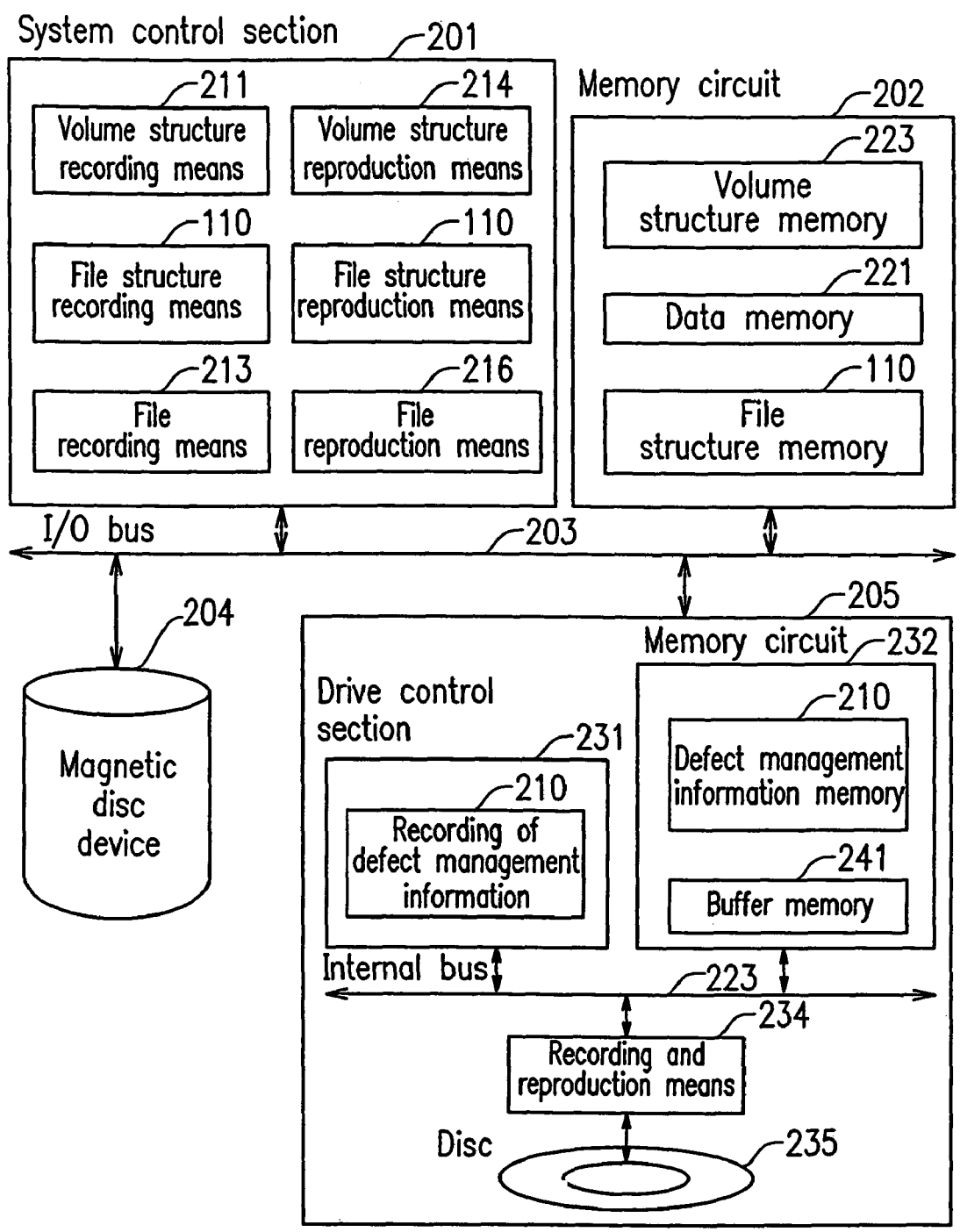
FIG. 22 is a block diagram illustrating a structure of an information recording and reproduction apparatus using a conventional DVD-RAM disc.
Figure 23:
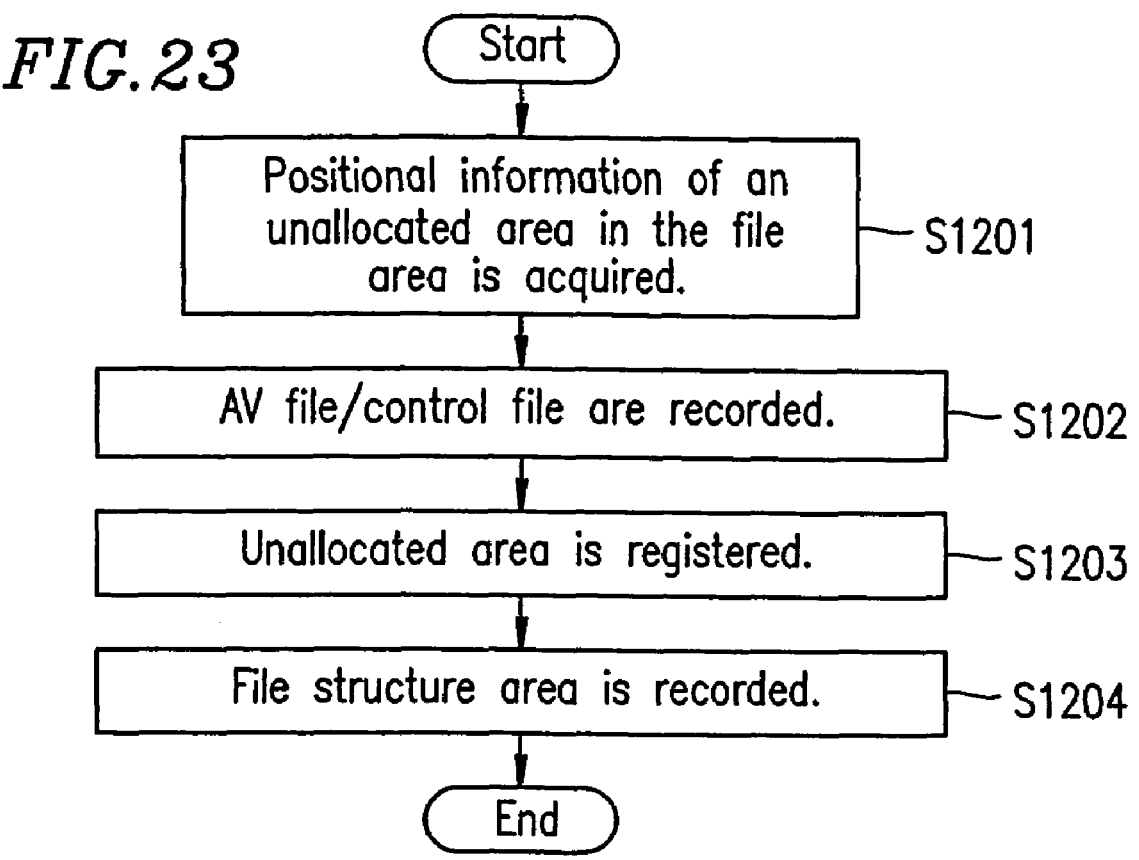
FIG. 23 is a flowchart illustrating a procedure of conventional file recording processing.

FIG. 20 shows a procedure for updating and recording an entry sector number. An update method for an entry sector number will be described.

(S3001) For the logical volume integrity descriptor sequence, an area corresponding to, for example, 32 sectors is saved. The logical volume integrity descriptors are sequentially recorded from the leading end the logical volume integrity descriptor sequence, and the final volume integrity descriptor recorded is recognized as a valid descriptor. The entry sector number is updated by recording a logical volume integrity descriptor in the subsequent logical sector. When there is no more subsequent logical sector, 00h is recorded in all the logical sectors in the logical volume integrity descriptor sequence, and the logical volume integrity descriptor is recorded at the leading end of the logical volume integrity descriptor sequence.

(S3002) When recording a logical volume integrity descriptor, it is checked whether or not the logical sector to be recorded is a defect sector. When it is not a defect sector, the processing is terminated. When it is a defect sector, the processing advances to step (S3003), where a logical volume integrity descriptor sequence is newly saved in an empty area in the volume structure area, so that the logical volume integrity descriptor is recorded.

In this manner, in the case of a disc to which data rewrite is limited to 100 times, a logical volume integrity descriptor can be recorded 32×100 times, using the same logical volume integrity descriptor sequence.

When a logical volume integrity descriptor sequence is newly allocated, it is necessary to record a logical volume descriptor for managing the positional information of the logical volume integrity descriptor sequence.

(S3004) For the volume descriptor sequence, an area corresponding to, for example, 16 sectors is saved. The logical volume descriptor has a field indicating a volume descriptor order number. When a plurality of logical volume descriptors are recorded in the volume descriptor sequence, the logical volume descriptor having the largest volume descriptor order number is valid. For recording the logical volume descriptors, empty logical sectors are searched for from the leading end of the volume descriptor sequence. The logical volume descriptors are recorded from the leading empty logical sector. When there is no empty logical sector, all the old logical volume descriptors are recorded with 00h so as to create an empty logical sector, and then the logical volume descriptors are recorded from the leading empty logical sector.

(S3005) When recording a logical volume descriptor, it is checked whether or not the logical sector to be recorded is a defect sector. When it is not a defect sector, the processing is terminated. When it is a defect sector, the processing advances to step (S3006), where a logical volume descriptor sequence is newly saved in an empty area in the volume structure area, so that the logical volume integrity descriptor is recorded together with a primary volume descriptor and a partition descriptor.

In this manner, in the case of a disc to which data rewrite is limited to 100 times, a logical volume descriptor can be recorded (16−2)×100 times, using the same logical volume descriptor sequence.

(S3007) When a volume descriptor sequence is newly allocated, an anchor volume descriptor pointer for managing the positional information of the volume descriptor sequence is updated and recorded.

Since the entry sector number is updated and recorded stepwise in this manner, recording can be performed (32×100)×((16−2)×100)×100 times in total even on a disc to which the number of times of data rewrite is limited to 100.

The step for updating and recording may be varied in accordance with the required number of times of data rewrite. It is clear that when 1000 times of rewrite is sufficient, the entry sector number can be rewritten in the same logical volume integrity descriptor sequence.

INDUSTRIAL APPLICABILITY

An information recording medium according to the present invention defines the order of use of unallocated areas registered in a space management structure, and records data while moving a latest file structure area from an inner portion to an outer portion. Thus, data destruction or defect due to concentration of data rewrite is prevented and data reliability can be improved.

The invention claimed is:

1. An information recording medium of which the number of times of data rewrite to an identical area is limited, the information recording medium comprising:

a first information recording area to which data is recordable by sequential loop recording; and a second information recording area, wherein:

the first information recording area includes a plurality of blocks, each of the plurality of blocks includes an area for recording version information indicating a version of the block and an area for recording pointer information indicating a position of the second information recording area, and pointer information corresponding to latest version information is used as valid pointer information.

2. An information recording medium according to claim 1, wherein the second information recording area is an area in which data is recordable by sequential loop recording.

3. An information recording method for recording information on an information recording medium of which the number of times of data rewrite to an identical area is limited, the information recording medium including a first information recording area to which data is recordable by sequential loop recording, and a second information recording area, wherein the first information recording area includes a plurality of blocks, the information recording method comprising the steps of:

designating one of the plurality of blocks; and recording, in the designated block, version information indicating a version of the designated block and pointer information indicating a position of the second information recording area, wherein pointer information corresponding to latest version information is used as valid pointer information.

4. An information recording apparatus for recording information on an information recording medium of which the number of times of data rewrite to an identical area is limited, the information recording medium including a first information recording area to which data is recordable by sequential loop recording, and a second information recording area, wherein the first information recording area includes a plurality of blocks, the information recording apparatus comprising:

means for designating one of the plurality of blocks; and means for recording, in the designated block, version information indicating a version of the designated block and pointer information indicating a position of the second information recording area, wherein pointer information corresponding to latest version information is used as valid pointer information.

* * * * *

UNITED STATES PATENT AND TRADEMARK OFFICE
CERTIFICATE OF CORRECTION

PATENT NO.       : 7,062,626 B2
APPLICATION NO.  : 10/343542
DATED            : June 13, 2006
INVENTOR(S)      : Miyuki Sasaki, Yoshiho Gotoh and Yoshihisa Fukushima It is certified that error appears in the above-identified patent and that said Letters Patent is hereby corrected as shown below:

Title Page, Section (56), under
FOREIGN PATENT DOCUMENTS,
"JP 2000-306362 2/2000" should read
-- JP 2000-306362 11/2000 --; and
"JP 2000-003562 7/2000" should read
-- JP 2000-003562 1/2000 --.

Signed and Sealed this

Fourteenth Day of November, 2006

JON W. DUDAS
*Director of the United States Patent and Trademark Office*